(12) United States Patent
Agarwal et al.

(10) Patent No.: US 8,769,660 B2
(45) Date of Patent: Jul. 1, 2014

(54) SYSTEMS AND METHODS FOR PROXYING COOKIES FOR SSL VPN CLIENTLESS SESSIONS

(75) Inventors: Puneet Agarwal, Karnataka (IN); Saibal Kumar Adhya, Karnataka (IN); Srinivasan Thirunarayanan, Karnataka (IN); James Harris, San Jose, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 903 days.

(21) Appl. No.: 12/360,019

(22) Filed: Jan. 26, 2009

(65) Prior Publication Data
US 2009/0199285 A1    Aug. 6, 2009

Related U.S. Application Data

(60) Provisional application No. 61/023,849, filed on Jan. 26, 2008.

(51) Int. Cl.
*G06F 15/16* (2006.01)
(52) U.S. Cl.
USPC .......................................... 726/12; 709/228
(58) Field of Classification Search
USPC ........ 726/12, 13; 713/201; 709/219, 228, 250
See application file for complete search history.

(56) References Cited

U.S. PATENT DOCUMENTS

| 5,774,670 A | 6/1998 | Montulli |
| 5,848,396 A | 12/1998 | Gerace |
| 5,862,325 A | 1/1999 | Reed et al. |
| 5,867,494 A | 2/1999 | Krishnaswamy et al. |
| 5,909,559 A | 6/1999 | So |
| 5,931,917 A | 8/1999 | Nguyen et al. |

(Continued)

FOREIGN PATENT DOCUMENTS

| AU | 7865401 A | 1/2002 |
| AU | 2004100333 A4 | 6/2004 |

(Continued)

OTHER PUBLICATIONS

"Aventail Smart Access: Secure and Easy for Users and IT." Jun. 21, 2006. http://www.findwhitepapers.com/force-download.php?id=255. Retrieved on Apr. 21, 2009.

(Continued)

*Primary Examiner* — Cordelia Zecher
*Assistant Examiner* — Abdullah Almamun
(74) *Attorney, Agent, or Firm* — Foley & Lardner LLP; Christopher J. McKenna; Paul M. H. Pua

(57) ABSTRACT

The present application enables the enterprise to configure various policies to address various subsets of the traffic based on various information relating the client, the server, or the details and nature of the interactions between the client and the server. An intermediary deployed between clients and servers may establish an SSL VPN session between a client and a server. The intermediary may receiving a response from a server to a request of a client via the clientless SSL VPN session. The response may comprise one or more cookies. The intermediary may identify an access profile for the clientless SSL VPN session. The access profile may identify one or more policies for proxying cookies. The intermediary may determine, responsive to the one or more policies of the access profile, whether to proxy or bypass proxying for the client the one or more cookies.

20 Claims, 14 Drawing Sheets

(56) References Cited

U.S. PATENT DOCUMENTS

| | | | |
|---|---|---|---|
| 5,973,696 A | 10/1999 | Agranat et al. | |
| 5,978,840 A | 11/1999 | Nguyen et al. | |
| 5,983,208 A | 11/1999 | Haller et al. | |
| 5,983,227 A | 11/1999 | Nazem et al. | |
| 5,991,735 A | 11/1999 | Gerace | |
| 5,999,525 A | 12/1999 | Krishnaswamy et al. | |
| 6,006,260 A | 12/1999 | Barrick et al. | |
| 6,009,410 A | 12/1999 | LeMole et al. | |
| 6,011,537 A | 1/2000 | Slotznick | |
| 6,026,379 A | 2/2000 | Haller et al. | |
| 6,055,564 A | 4/2000 | Phaal | |
| 6,078,956 A | 6/2000 | Bryant et al. | |
| 6,085,224 A | 7/2000 | Wagner | |
| 6,088,717 A | 7/2000 | Reed et al. | |
| 6,108,662 A | 8/2000 | Hoskins et al. | |
| 6,141,699 A | 10/2000 | Luzzi et al. | |
| 6,157,864 A | 12/2000 | Schwenke et al. | |
| 6,161,051 A | 12/2000 | Hafemann et al. | |
| 6,161,139 A | 12/2000 | Win et al. | |
| 6,163,772 A | 12/2000 | Kramer et al. | |
| 6,167,406 A | 12/2000 | Hoskins et al. | |
| 6,167,441 A | 12/2000 | Himmel | |
| 6,170,017 B1 | 1/2001 | Dias et al. | |
| 6,178,409 B1 | 1/2001 | Weber et al. | |
| 6,182,139 B1 | 1/2001 | Brendel | |
| 6,182,142 B1 | 1/2001 | Win et al. | |
| 6,185,625 B1 * | 2/2001 | Tso et al. | 709/247 |
| 6,208,991 B1 | 3/2001 | French et al. | |
| 6,247,050 B1 * | 6/2001 | Tso et al. | 709/224 |
| 6,253,027 B1 | 6/2001 | Weber et al. | |
| 6,256,739 B1 | 7/2001 | Skopp et al. | |
| 6,263,365 B1 | 7/2001 | Scherpbier | |
| 6,268,853 B1 | 7/2001 | Hoskins et al. | |
| 6,300,947 B1 | 10/2001 | Kanevsky | |
| 6,304,915 B1 | 10/2001 | Nguyen et al. | |
| 6,314,406 B1 | 11/2001 | O'Hagan et al. | |
| 6,317,777 B1 | 11/2001 | Skarbo et al. | |
| 6,321,235 B1 | 11/2001 | Bird | |
| 6,324,525 B1 | 11/2001 | Kramer et al. | |
| 6,334,111 B1 | 12/2001 | Carrott | |
| 6,335,927 B1 | 1/2002 | Elliott et al. | |
| 6,345,288 B1 | 2/2002 | Reed et al. | |
| 6,360,270 B1 | 3/2002 | Cherkasova et al. | |
| 6,363,363 B1 | 3/2002 | Haller et al. | |
| 6,373,950 B1 | 4/2002 | Rowney | |
| 6,374,300 B2 | 4/2002 | Masters | |
| 6,383,478 B1 | 5/2002 | Prokop et al. | |
| 6,393,467 B1 | 5/2002 | Potvin | |
| 6,397,253 B1 | 5/2002 | Quinlan et al. | |
| 6,400,996 B1 | 6/2002 | Hoffberg et al. | |
| 6,421,768 B1 | 7/2002 | Purpura | |
| 6,430,567 B2 | 8/2002 | Burridge | |
| 6,438,597 B1 | 8/2002 | Mosberger et al. | |
| 6,446,109 B2 | 9/2002 | Gupta | |
| 6,449,627 B1 | 9/2002 | Baer et al. | |
| 6,449,658 B1 | 9/2002 | Lafe et al. | |
| 6,466,940 B1 | 10/2002 | Mills | |
| 6,473,802 B2 | 10/2002 | Masters | |
| 6,502,102 B1 | 12/2002 | Haswell et al. | |
| 6,505,230 B1 | 1/2003 | Mohan et al. | |
| 6,510,466 B1 | 1/2003 | Cox et al. | |
| 6,515,968 B1 | 2/2003 | Combar et al. | |
| 6,523,027 B1 | 2/2003 | Underwood | |
| 6,549,612 B2 | 4/2003 | Gifford et al. | |
| 6,553,377 B1 | 4/2003 | Eschelbeck et al. | |
| 6,556,950 B1 | 4/2003 | Schwenke et al. | |
| 6,560,639 B1 | 5/2003 | Dan et al. | |
| 6,567,852 B2 | 5/2003 | Besaw et al. | |
| 6,578,073 B1 | 6/2003 | Starnes et al. | |
| 6,584,567 B1 | 6/2003 | Bellwood et al. | |
| 6,584,569 B2 | 6/2003 | Reshef et al. | |
| 6,591,266 B1 | 7/2003 | Li et al. | |
| 6,595,417 B2 | 7/2003 | O'Hagan et al. | |
| 6,601,057 B1 | 7/2003 | Underwood et al. | |
| 6,601,233 B1 | 7/2003 | Underwood | |
| 6,606,744 B1 | 8/2003 | Mikurak | |
| 6,609,128 B1 | 8/2003 | Underwood | |
| 6,609,198 B1 | 8/2003 | Wood et al. | |
| 6,611,840 B1 | 8/2003 | Baer et al. | |
| 6,625,643 B1 | 9/2003 | Colby et al. | |
| 6,629,081 B1 | 9/2003 | Cornelius et al. | |
| 6,631,416 B2 | 10/2003 | Bendinelli et al. | |
| 6,633,878 B1 | 10/2003 | Underwood | |
| 6,640,145 B2 | 10/2003 | Hoffberg et al. | |
| 6,640,240 B1 | 10/2003 | Hoffman et al. | |
| 6,640,302 B1 * | 10/2003 | Subramaniam et al. | 713/169 |
| 6,643,696 B2 | 11/2003 | Davis et al. | |
| 6,671,818 B1 | 12/2003 | Mikurak | |
| 6,680,922 B1 | 1/2004 | Jorgensen | |
| 6,687,745 B1 | 2/2004 | Franco et al. | |
| 6,691,232 B1 | 2/2004 | Wood et al. | |
| 6,697,824 B1 | 2/2004 | Bowman-Amuah | |
| 6,701,514 B1 | 3/2004 | Haswell et al. | |
| 6,704,873 B1 | 3/2004 | Underwood | |
| 6,714,219 B2 | 3/2004 | Lindhorst et al. | |
| 6,714,979 B1 | 3/2004 | Brandt et al. | |
| 6,718,328 B1 | 4/2004 | Norris | |
| 6,718,535 B1 | 4/2004 | Underwood | |
| 6,731,625 B1 | 5/2004 | Eastep et al. | |
| 6,732,331 B1 | 5/2004 | Alexander | |
| 6,735,497 B2 | 5/2004 | Wallace et al. | |
| 6,754,181 B1 | 6/2004 | Elliott et al. | |
| 6,754,699 B2 | 6/2004 | Swildens et al. | |
| 6,754,706 B1 | 6/2004 | Swildens et al. | |
| 6,757,365 B1 | 6/2004 | Bogard | |
| 6,757,710 B2 | 6/2004 | Reed | |
| 6,771,290 B1 | 8/2004 | Hoyle | |
| 6,772,139 B1 | 8/2004 | Smith, III | |
| 6,772,203 B1 | 8/2004 | Feiertag et al. | |
| 6,785,653 B1 | 8/2004 | White et al. | |
| 6,789,170 B1 | 9/2004 | Jacobs et al. | |
| RE38,609 E | 10/2004 | Chen et al. | |
| 6,820,125 B1 | 11/2004 | Dias et al. | |
| 6,823,374 B2 | 11/2004 | Kausik et al. | |
| 6,826,594 B1 | 11/2004 | Pettersen | |
| 6,826,696 B1 | 11/2004 | Chawla et al. | |
| 6,839,701 B1 | 1/2005 | Baer et al. | |
| 6,850,252 B1 | 2/2005 | Hoffberg | |
| 6,862,553 B2 | 3/2005 | Schwenke et al. | |
| 6,879,965 B2 | 4/2005 | Fung et al. | |
| 6,889,379 B1 | 5/2005 | Lindhorst et al. | |
| 6,904,449 B1 | 6/2005 | Quinones | |
| 6,907,546 B1 | 6/2005 | Haswell et al. | |
| 6,909,708 B1 | 6/2005 | Krishnaswamy et al. | |
| 6,910,180 B1 | 6/2005 | Cui et al. | |
| 6,917,972 B1 | 7/2005 | Basko et al. | |
| 6,928,469 B1 | 8/2005 | Duursma et al. | |
| 6,952,425 B1 | 10/2005 | Nelson | |
| 6,952,714 B2 | 10/2005 | Peart | |
| 6,968,364 B1 | 11/2005 | Wong et al. | |
| 6,976,090 B2 | 12/2005 | Ben-Shaul et al. | |
| 6,980,962 B1 | 12/2005 | Arganbright et al. | |
| 6,981,143 B2 | 12/2005 | Mullen et al. | |
| 6,981,215 B1 | 12/2005 | Lindhorst et al. | |
| 6,983,331 B1 | 1/2006 | Mitchell et al. | |
| 6,986,102 B1 | 1/2006 | Baer et al. | |
| 6,987,987 B1 | 1/2006 | Vacanti et al. | |
| 6,988,126 B2 | 1/2006 | Wilcock et al. | |
| 6,993,456 B2 | 1/2006 | Brooks et al. | |
| 6,996,605 B2 | 2/2006 | Low et al. | |
| 6,996,616 B1 | 2/2006 | Leighton et al. | |
| 6,996,628 B2 | 2/2006 | Keane et al. | |
| 7,000,019 B2 | 2/2006 | Low et al. | |
| 7,003,565 B2 * | 2/2006 | Hind et al. | 709/224 |
| 7,006,881 B1 | 2/2006 | Hoffberg et al. | |
| 7,006,893 B2 | 2/2006 | Hart et al. | |
| 7,006,993 B1 | 2/2006 | Cheong et al. | |
| 7,007,034 B1 | 2/2006 | Hartman et al. | |
| 7,013,290 B2 | 3/2006 | Ananian | |
| 7,024,477 B2 | 4/2006 | Allan | |
| 7,028,333 B2 | 4/2006 | Tuomenoksa et al. | |
| 7,028,334 B2 | 4/2006 | Tuomenoksa | |
| 7,032,010 B1 | 4/2006 | Swildens et al. | |
| 7,032,030 B1 | 4/2006 | Codignotto | |

(56) References Cited

U.S. PATENT DOCUMENTS

| | | |
|---|---|---|
| 7,034,691 B1 | 4/2006 | Rapaport et al. |
| 7,035,907 B1 | 4/2006 | Decasper et al. |
| 7,042,879 B2 | 5/2006 | Eschbach et al. |
| 7,043,488 B1 | 5/2006 | Baer et al. |
| 7,047,315 B1 | 5/2006 | Srivastava |
| 7,047,424 B2 | 5/2006 | Bendinelli et al. |
| 7,051,036 B2 | 5/2006 | Rosnow et al. |
| 7,051,080 B1 | 5/2006 | Paul et al. |
| 7,055,169 B2 | 5/2006 | Delpuch et al. |
| 7,058,718 B2 | 6/2006 | Fontes et al. |
| 7,069,234 B1 | 6/2006 | Cornelius et al. |
| 7,072,807 B2 | 7/2006 | Brown et al. |
| 7,076,494 B1 | 7/2006 | Baer et al. |
| 7,085,817 B1 * | 8/2006 | Tock et al. ............... 709/217 |
| 7,085,834 B2 | 8/2006 | Delany et al. |
| 7,085,854 B2 | 8/2006 | Keane et al. |
| 7,089,239 B1 | 8/2006 | Baer et al. |
| 7,092,370 B2 | 8/2006 | Jiang et al. |
| 7,093,018 B1 | 8/2006 | Sievers et al. |
| 7,093,020 B1 | 8/2006 | McCarty et al. |
| 7,096,418 B1 | 8/2006 | Singhal et al. |
| 7,096,495 B1 | 8/2006 | Warrier et al. |
| 7,100,054 B2 | 8/2006 | Wenisch et al. |
| 7,100,195 B1 | 8/2006 | Underwood |
| 7,102,996 B1 | 9/2006 | Amdahl et al. |
| 7,107,309 B1 | 9/2006 | Geddes et al. |
| 7,107,338 B1 | 9/2006 | Nareddy et al. |
| 7,117,243 B2 | 10/2006 | Peart |
| 7,117,359 B2 | 10/2006 | Wood et al. |
| 7,117,504 B2 | 10/2006 | Smith et al. |
| 7,124,101 B1 | 10/2006 | Mikurak |
| 7,124,175 B1 | 10/2006 | Wolfe et al. |
| 7,127,713 B2 | 10/2006 | Davis et al. |
| 7,130,792 B2 | 10/2006 | Tokieda et al. |
| 7,130,807 B1 | 10/2006 | Mikurak |
| 7,133,837 B1 | 11/2006 | Barnes, Jr. |
| 7,134,131 B1 | 11/2006 | Hendricks et al. |
| 7,145,898 B1 | 12/2006 | Elliott |
| 7,146,384 B2 | 12/2006 | Sawafta |
| 7,152,207 B1 | 12/2006 | Underwood et al. |
| 7,162,509 B2 | 1/2007 | Brown et al. |
| 7,167,844 B1 | 1/2007 | Leong et al. |
| 7,171,478 B2 | 1/2007 | Lueckhoff et al. |
| 7,178,106 B2 | 2/2007 | Lamkin et al. |
| 7,181,766 B2 | 2/2007 | Bendinelli et al. |
| 7,188,183 B1 | 3/2007 | Paul et al. |
| 7,188,216 B1 | 3/2007 | Rajkumar et al. |
| 7,197,502 B2 | 3/2007 | Feinsmith |
| 7,200,530 B2 | 4/2007 | Brown et al. |
| 7,203,722 B2 | 4/2007 | Elnozahy |
| 7,206,805 B1 | 4/2007 | McLaughlin, Jr. |
| 7,209,466 B2 | 4/2007 | Cabana |
| 7,210,100 B2 | 4/2007 | Berger et al. |
| 7,213,071 B2 * | 5/2007 | DeLima et ............... 709/227 |
| 7,216,149 B1 | 5/2007 | Briscoe et al. |
| 7,216,713 B2 | 5/2007 | Read, Jr. |
| 7,225,244 B2 | 5/2007 | Reynolds et al. |
| 7,231,357 B1 | 6/2007 | Shanman et al. |
| 7,231,405 B2 | 6/2007 | Xia |
| 7,246,230 B2 | 7/2007 | Stanko |
| 7,313,613 B1 | 12/2007 | Brooking et al. |
| 7,313,822 B2 | 12/2007 | Ben-Itzhak |
| 7,330,872 B2 | 2/2008 | Peart et al. |
| 7,343,486 B2 | 3/2008 | McCarty et al. |
| 7,350,194 B1 | 3/2008 | Alpern |
| 7,360,025 B1 | 4/2008 | O'Connell et al. |
| 7,370,351 B1 * | 5/2008 | Ramachandran et al. ......... 726/8 |
| 7,373,462 B2 | 5/2008 | Blumrich et al. |
| 7,389,540 B2 | 6/2008 | Radatti et al. |
| 7,441,119 B2 | 10/2008 | Brabson et al. |
| 7,444,674 B1 * | 10/2008 | Etique et al. ............... 726/12 |
| 7,464,332 B2 | 12/2008 | Carter, II |
| 7,506,359 B1 | 3/2009 | Ling |
| 7,512,702 B1 | 3/2009 | Srivastava et al. |
| 7,565,450 B2 | 7/2009 | Garcia-Luna-Aceves et al. |
| 7,571,464 B2 | 8/2009 | Watkins |
| 7,584,500 B2 | 9/2009 | Dillon et al. |
| 7,616,597 B2 | 11/2009 | Liu et al. |
| 7,954,144 B1 * | 5/2011 | Ebrahimi et al. ............... 726/12 |
| 8,073,829 B2 * | 12/2011 | Lopez et al. ............... 707/705 |
| 8,078,739 B1 * | 12/2011 | Somasundaram et al. .... 709/229 |
| 8,150,757 B1 * | 4/2012 | Sieffert et al. ............... 705/37 |
| 8,271,636 B2 * | 9/2012 | L'Heureux et al. .......... 709/223 |
| 8,468,245 B2 * | 6/2013 | Farber et al. .................. 709/226 |
| 8,484,711 B1 * | 7/2013 | Coletta et al. .................... 726/7 |
| 2001/0037387 A1 | 11/2001 | Gilde et al. |
| 2001/0037400 A1 | 11/2001 | Raz et al. |
| 2002/0007404 A1 | 1/2002 | Vange et al. |
| 2002/0010855 A1 | 1/2002 | Reshef et al. |
| 2002/0023210 A1 | 2/2002 | Tuomenoksa et al. |
| 2002/0026531 A1 | 2/2002 | Keane et al. |
| 2002/0033844 A1 | 3/2002 | Levy et al. |
| 2002/0049900 A1 | 4/2002 | Patrick |
| 2002/0055912 A1 * | 5/2002 | Buck ............... 705/76 |
| 2002/0055966 A1 | 5/2002 | Border et al. |
| 2002/0059327 A1 | 5/2002 | Starkey |
| 2002/0059425 A1 | 5/2002 | Belfiore et al. |
| 2002/0065911 A1 | 5/2002 | Von Klopp et al. |
| 2002/0065919 A1 | 5/2002 | Taylor et al. |
| 2002/0078147 A1 | 6/2002 | Bouthors et al. |
| 2002/0083175 A1 | 6/2002 | Afek et al. |
| 2002/0083178 A1 | 6/2002 | Brothers |
| 2002/0091859 A1 | 7/2002 | Tuomenoksa et al. |
| 2002/0116582 A1 | 8/2002 | Copeland et al. |
| 2002/0116642 A1 | 8/2002 | Joshi et al. |
| 2002/0120743 A1 | 8/2002 | Shabtay et al. |
| 2002/0129271 A1 | 9/2002 | Stanaway et al. |
| 2002/0133723 A1 | 9/2002 | Tait |
| 2002/0138511 A1 | 9/2002 | Psounis et al. |
| 2002/0138572 A1 | 9/2002 | Delany et al. |
| 2002/0138618 A1 | 9/2002 | Szabo |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0147927 A1 | 10/2002 | Tait |
| 2002/0156831 A1 | 10/2002 | Suorsa et al. |
| 2002/0161801 A1 | 10/2002 | Hind et al. |
| 2002/0161904 A1 | 10/2002 | Tredoux et al. |
| 2002/0165971 A1 | 11/2002 | Baron |
| 2002/0178211 A1 | 11/2002 | Singhal et al. |
| 2003/0014368 A1 | 1/2003 | Leurig et al. |
| 2003/0023873 A1 | 1/2003 | Ben-Itzhak |
| 2003/0037108 A1 | 2/2003 | Peiffer et al. |
| 2003/0051142 A1 | 3/2003 | Hidalgo et al. |
| 2003/0055762 A1 * | 3/2003 | Holt ............... 705/36 |
| 2003/0061275 A1 * | 3/2003 | Brown et al. ............... 709/203 |
| 2003/0065763 A1 | 4/2003 | Swildens et al. |
| 2003/0069803 A1 | 4/2003 | Pollitt |
| 2003/0069923 A1 | 4/2003 | Peart |
| 2003/0069924 A1 | 4/2003 | Peart et al. |
| 2003/0074580 A1 | 4/2003 | Knouse et al. |
| 2003/0105957 A1 | 6/2003 | Brabson et al. |
| 2003/0110192 A1 | 6/2003 | Valente et al. |
| 2003/0110266 A1 | 6/2003 | Rollins et al. |
| 2003/0126266 A1 | 7/2003 | Peles |
| 2003/0131045 A1 | 7/2003 | McGee et al. |
| 2003/0131081 A1 | 7/2003 | Nareddy et al. |
| 2003/0131100 A1 | 7/2003 | Godon et al. |
| 2003/0140312 A1 | 7/2003 | Mohan et al. |
| 2003/0144988 A1 | 7/2003 | Nareddy et al. |
| 2003/0154239 A1 | 8/2003 | Davis et al. |
| 2003/0182357 A1 | 9/2003 | Chess et al. |
| 2003/0182423 A1 | 9/2003 | Shafir et al. |
| 2003/0191812 A1 | 10/2003 | Agarwalla et al. |
| 2003/0206554 A1 | 11/2003 | Dillon |
| 2003/0217149 A1 | 11/2003 | Crichton et al. |
| 2003/0233541 A1 | 12/2003 | Fowler et al. |
| 2003/0233581 A1 | 12/2003 | Reshef et al. |
| 2004/0031058 A1 | 2/2004 | Reisman |
| 2004/0039822 A1 | 2/2004 | Bensimon |
| 2004/0039827 A1 | 2/2004 | Thomas et al. |
| 2004/0044731 A1 | 3/2004 | Chen et al. |
| 2004/0044768 A1 | 3/2004 | Takahashi |
| 2004/0049673 A1 | 3/2004 | Song et al. |

(56) References Cited

U.S. PATENT DOCUMENTS

| | | |
|---|---|---|
| 2004/0073512 A1 | 4/2004 | Maung |
| 2004/0073629 A1 | 4/2004 | Bazot et al. |
| 2004/0073630 A1 | 4/2004 | Copeland et al. |
| 2004/0088349 A1 | 5/2004 | Beck et al. |
| 2004/0122951 A1 | 6/2004 | Beck et al. |
| 2004/0128346 A1 | 7/2004 | Melamed et al. |
| 2004/0158429 A1 | 8/2004 | Bary et al. |
| 2004/0162876 A1 | 8/2004 | Kohavi |
| 2004/0177247 A1 | 9/2004 | Peles |
| 2004/0181750 A1 | 9/2004 | Lection et al. |
| 2004/0210771 A1 | 10/2004 | Wood et al. |
| 2004/0267820 A1 | 12/2004 | Boss et al. |
| 2004/0268357 A1 | 12/2004 | Joy et al. |
| 2004/0268358 A1 | 12/2004 | Darling et al. |
| 2005/0015429 A1 | 1/2005 | Ashley et al. |
| 2005/0015601 A1 | 1/2005 | Tabi |
| 2005/0027799 A1 | 2/2005 | Tsutsui et al. |
| 2005/0033858 A1 | 2/2005 | Swildens et al. |
| 2005/0039190 A1 | 2/2005 | Rees et al. |
| 2005/0055577 A1 | 3/2005 | Wesemann et al. |
| 2005/0074126 A1 | 4/2005 | Stanko |
| 2005/0108517 A1 | 5/2005 | Dillon et al. |
| 2005/0120054 A1 | 6/2005 | Shulman et al. |
| 2005/0122980 A1 | 6/2005 | Anand et al. |
| 2005/0132030 A1 | 6/2005 | Hopen et al. |
| 2005/0144315 A1* | 6/2005 | George et al. ............... 709/238 |
| 2005/0144481 A1 | 6/2005 | Hopen et al. |
| 2005/0183140 A1 | 8/2005 | Goddard |
| 2005/0198335 A1 | 9/2005 | Brown et al. |
| 2005/0198380 A1 | 9/2005 | Panasyuk et al. |
| 2005/0251856 A1 | 11/2005 | Araujo et al. |
| 2005/0256923 A1 | 11/2005 | Adachi |
| 2005/0262063 A1 | 11/2005 | Conboy et al. |
| 2005/0262357 A1 | 11/2005 | Araujo et al. |
| 2005/0273849 A1 | 12/2005 | Araujo et al. |
| 2005/0273850 A1 | 12/2005 | Freund |
| 2006/0041635 A1 | 2/2006 | Alexander et al. |
| 2006/0047974 A1 | 3/2006 | Alpern et al. |
| 2006/0068755 A1 | 3/2006 | Shraim et al. |
| 2006/0075464 A1 | 4/2006 | Golan et al. |
| 2006/0080432 A1 | 4/2006 | Spataro et al. |
| 2006/0112174 A1 | 5/2006 | L'Heureux et al. |
| 2006/0161970 A1 | 7/2006 | Hopen et al. |
| 2007/0005777 A1 | 1/2007 | Fremantle et al. |
| 2007/0011340 A1 | 1/2007 | Seidl et al. |
| 2007/0061067 A1 | 3/2007 | Zeinstra et al. |
| 2007/0067046 A1 | 3/2007 | Berg |
| 2007/0101418 A1 | 5/2007 | Wood et al. |
| 2007/0136477 A1 | 6/2007 | Bryce et al. |
| 2007/0156852 A1 | 7/2007 | Sundarrajan et al. |
| 2007/0169179 A1 | 7/2007 | Narad |
| 2007/0179955 A1 | 8/2007 | Croft et al. |
| 2007/0180088 A1 | 8/2007 | Zhao |
| 2007/0192444 A1 | 8/2007 | Ackaouy et al. |
| 2007/0192853 A1 | 8/2007 | Shraim et al. |
| 2007/0245409 A1 | 10/2007 | Harris et al. |
| 2007/0289006 A1* | 12/2007 | Ramachandran et al. ...... 726/10 |
| 2007/0294762 A1 | 12/2007 | Shraim et al. |
| 2007/0299915 A1 | 12/2007 | Shraim et al. |
| 2007/0300185 A1 | 12/2007 | Macbeth et al. |
| 2008/0016233 A1 | 1/2008 | Schneider |
| 2008/0034416 A1 | 2/2008 | Kumar et al. |
| 2008/0034425 A1 | 2/2008 | Overcash et al. |
| 2008/0046616 A1 | 2/2008 | Verzunov et al. |
| 2008/0049786 A1 | 2/2008 | Ram et al. |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2009/0106349 A1 | 4/2009 | Harris |
| 2010/0071052 A1 | 3/2010 | Mao et al. |

FOREIGN PATENT DOCUMENTS

| | | |
|---|---|---|
| CN | 1363068 A | 8/2002 |
| EP | 0 863 453 A1 | 9/1998 |
| EP | 1 311 957 A2 | 5/2003 |
| EP | 1 345 378 A2 | 9/2003 |
| EP | 1 376 410 A1 | 1/2004 |
| EP | 1 398 715 A2 | 3/2004 |
| EP | 2 015 236 A1 | 1/2009 |
| GB | 2 300 551 | 11/1996 |
| JP | 2004-504681 T | 2/2004 |
| WO | WO-99/64967 A1 | 12/1999 |
| WO | WO-00/51031 | 8/2000 |
| WO | WO-00/68823 A2 | 11/2000 |
| WO | WO-01/54375 A2 | 7/2001 |
| WO | WO-02/13026 | 2/2002 |
| WO | WO-02/27552 A2 | 4/2002 |
| WO | WO-02/45370 A2 | 6/2002 |
| WO | WO-03/029977 A2 | 4/2003 |
| WO | WO-2004/072804 | 8/2004 |
| WO | WO-2004/114529 A2 | 12/2004 |
| WO | WO-2006/012612 | 2/2006 |
| WO | WO-2006/074072 A2 | 7/2006 |
| WO | WO-2007/024647 A2 | 3/2007 |
| WO | WO-2007/065146 A2 | 7/2007 |
| WO | WO-2008/112691 A2 | 9/2008 |
| WO | WO-2008/112692 A2 | 9/2008 |
| WO | WO-2008/112698 A2 | 9/2008 |

OTHER PUBLICATIONS

"Remote Access Anytime, Anywhere." 2007. http://www.metadigm.co.uk/resources/documents/datasheets/checkpoint/Remote%20access/SSL_Network_Extender_whitepaper.pdf. Retrieved Apr. 21, 2009.

"User Guide for Cisco Security Manager 3.1." Sep. 24, 2007. http://www.cisco.com/en/US/docs/security/security_management/security_manager/3.1/user/guide/smcfg.pdf. Retrieved Apr. 21, 2009. pp. 799-854, 2555-2624.

"What's new in NGX: Connectra." Oct. 21, 2007. http://web.archive.org/web/20071021192852/http://www.checkpoint.com/ngx/upgrade/whatsnew/products/connectra.html. Retrieved on Apr. 21, 2009.

Barrett, R. et al., "Intermediaries: New Places for Producing and Manipulating Web Content," Computer Networks and ISDN Systems, North Holland Publishing, Amsterdam, NL, vol. 30, No. 1-7, Apr. 1998.

Final Office Action for U.S. Appl. No. 11/462,308 dated Feb. 24, 2010.

Final Office Action for U.S. Appl. No. 11/462,267 dated Nov. 10, 2010.

International Search Report from PCT/US2009/032046, mailed Jul. 8, 2009, 6 pages.

International Preliminary Report on Patentability, PCT/US2007/075037, mailed on Feb. 3, 2009.

International Search Report from PCT/US2009/032042, mailed Jul. 10, 2009, 6 pages.

International Search Report, PCT/US08/074400, mailed Jan. 20, 2009, 4 pages.

International Search Report, PCT/US2007/075178, mailed on Jan. 28, 2008.

Non-Final Office Action for U.S. Appl. No. 11/875,671 dated Jun. 23, 2010.

Non-final Office Action for U.S. Appl. No. 11/462,308 dated Aug. 4, 2009.

Non-final Office Action for U.S. Appl. No. 11/462,308 dated Nov. 12, 2010.

Non-final Office Action for U.S. Appl. No. 11/462,267 dated May 27, 2010.

Notice of Allowance on U.S. Appl. No. 12/360,014 dated Sep. 1, 2011.

Office Action on U.S. Appl. No. 11/462,267 dated May 11, 2011.
Office Action on U.S. Appl. No. 11/462,300 dated Feb. 14, 2011.
Office Action on U.S. Appl. No. 11/462,308 dated May 10, 2011.
Office Action on U.S. Appl. No. 12/360,014 dated Nov. 29, 2010.

(56) References Cited

OTHER PUBLICATIONS

Office Action on U.S. Appl. No. 12/360,014 dated May 26, 2011.
Tichenor, Charles B., "JavaScript Cookies," Dr. Dobb's Journal, May 1, 1997, p. 1-7.
Written Opinion from PCT/US2009/032042, mailed Jul. 10, 2009, 11 pages.
Written Opinion from PCT/US2009/032046, mailed Jul. 8, 2009, 11 pages.
Written Opinion of the International Searching Authority, PCT/US07/075037, mailed on Oct. 1, 2008.
Written Opinion of the International Searching Authority, PCT/US07/075178, mailed on Jan. 28, 2008, 7 pages.
Written Opinion of the International Searching Authority, PCT/US08/07440, mailed on Jan. 20, 2009, 7 pages.
Non-final Office Action U.S. Appl. No. 11/462,300 dated Jul. 8, 2009.
First Office Action issued Nov. 5, 2012 in Chinese Application No. 200980109863.X.
Office Action issued Dec. 4, 2013 in Chinese Patent Application No. 200980109863.X.
Second Office Action issued May 31, 2013 in Chinese Patent Application No. 200980109863.X.

\* cited by examiner

SYSTEMS AND METHODS FOR PROXYING COOKIES FOR SSL VPN CLIENTLESS SESSIONS

RELATED APPLICATIONS

The present application claims priority to U.S. Provisional Application No. 61/023,849 filed on Jan. 26, 2008, incorporated herein by reference.

FIELD OF THE INVENTION

The present application generally relates to data communication networks. In particular, the present application relates to systems and methods for fine grain policy driven cookie proxying management, clientless cookie management and techniques for cookie proxying.

BACKGROUND OF THE INVENTION

An enterprise may provide various services across a network to a number of different clients. Some of the clients may connect to the network via more secured connections, while other clients may be using less secure network connections. Similarly, some of the clients may be configured to use cookies for network communication with servers, while other clients may not. In instances where cookies are used by a server of the enterprise to provide a service, a client that is not enabled to use cookies may have difficulty connecting and using the service. Such variations in network configurations and network connections among the clients may create challenges to the enterprise in providing services to these clients.

BRIEF SUMMARY OF THE INVENTION

A solution is presented enables the enterprise to decide which cookies may be proxyed and how and which cookies may not be proxyed. The solution presented enables the enterprise to configure various policies to address various subsets of the traffic based on various information relating to the client, the server, or the details and nature of the interactions between the client and the server. For example, an intermediary deployed between clients and servers may establish an SSL VPN session between a client and a server. The intermediary may receive a response from a server to a request of a client via the clientless SSL VPN session. The response may comprise one or more cookies. The intermediary may identify an access profile for the clientless SSL VPN session. The access profile may identify one or more policies for proxying cookies. The intermediary may determine, responsive to the one or more policies of the access profile, whether to proxy or bypass proxying for the client the one or more cookies.

In some aspects, the present disclosure relates to a method for configuration driven proxying by an intermediary of cookies between one or more servers and one or more clients. The intermediary may establish SSL VPN sessions between the one or more servers and the one or more clients. The intermediary may receive a response from a server to a request of a client via a clientless SSL VPN session established by the intermediary between the server and the client. The response may comprise one or more cookies. The intermediary may identify an access profile for the clientless SSL VPN session. The access profile may identify one or more policies for proxying cookies. The intermediary may determine, responsive to the one or more policies of the access profile, whether to proxy or bypass proxying for the client the one or more cookies.

In some embodiments, the intermediary receives a client consumed cookie of the one or more cookies. The access profile may identify a policy comprising a cookie proxy action for the client consumed cookie. In further embodiments, the intermediary further bypasses proxying of the client consumed cookie responsive to the policy. In further embodiments, the intermediary retains the client consumed cookie in the response forwarded to the client. In yet further embodiments, the intermediary receives via the response a server cookie of the one or more cookies and proxies the server cookie. In still further embodiments, the intermediary removes the server cookie from the response and forwards the response to the client. In yet other embodiments, the intermediary proxies the one or more cookies of the response responsive to determine via the one or more policies that client does not support the one or more cookies. In still further embodiments, the access profile identifies a policy defining a cookie proxy action for a server consumed cookie of a specified domain name and the intermediary modifies the response as specified by the action of the policy.

In some embodiments, the intermediary identifies the access profile using the request or the response based on identification of a type of application. In further embodiments, the access profile identifies a policy comprising a cookie proxy action to bypass proxying a cookie of the one or more cookies based on identification of a user or a group of the user. In still further embodiments, the access profile identifies a policy to bypass proxying a cookie of the one or more cookies based on identification of a virtual server of the intermediary. In yet further embodiments, the intermediary proxies the one or more cookies of the response unless the one or more policies of the access profile identify a cookie of the one or more cookies to be bypassed.

In some aspects, the present application relates to an intermediary for configuration driven proxying of cookies between one or more servers and one or more clients. An intermediary may establish SSL VPN sessions between the one or more servers and the one or more clients. A packet engine for receiving a response from a server to a request of a client via a clientless SSL VPN session may be established by the intermediary between the server and the client. The response may comprise one or more cookies. A policy engine for identifying an access profile for the clientless SSL VPN session, the access profile identifying one or more policies for proxying cookies. The intermediary determines, responsive to the one or more policies of the access profile, whether to proxy or bypass proxying for the client the one or more cookies.

In some embodiments, the packet engine receives via the response a client consumed cookie of the one or more cookies. In some embodiments, the access profile identifies a policy comprising a cookie proxy action for the client consumed cookie. In further embodiments, the intermediary determines to bypass proxying the client consumed cookie responsive to the policy. In some embodiments, the intermediary retains the client consumed cookie in the response forwarded to the client. In further embodiments, the packet engine receives via the response a server cookie of the one or more cookies and wherein the intermediary proxies the server cookie responsive to the one or more policies. In still further embodiments, the intermediary removes the server cookie from the response and forwards the response to the client. In some embodiments, the intermediary proxies the one or more cookies of the response responsive to determining via the one or more policies that client does not support the one or more cookies.

In some embodiments, the policy engine identifies via the access profile a policy of the one or more policies defining a cookie proxy action for a server consumed cookie of a specified domain name. In further embodiments, the intermediary modifies the response as specified by the action of the policy. In some embodiments, the policy engine identifies via the request or the response the access profiled based on identification of a type of application. In some embodiments, the policy engine identifies via the access profile a policy comprising a cookie proxy action to bypass proxying a cookie of the one or more cookies based on identification of a user or a group of the user.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
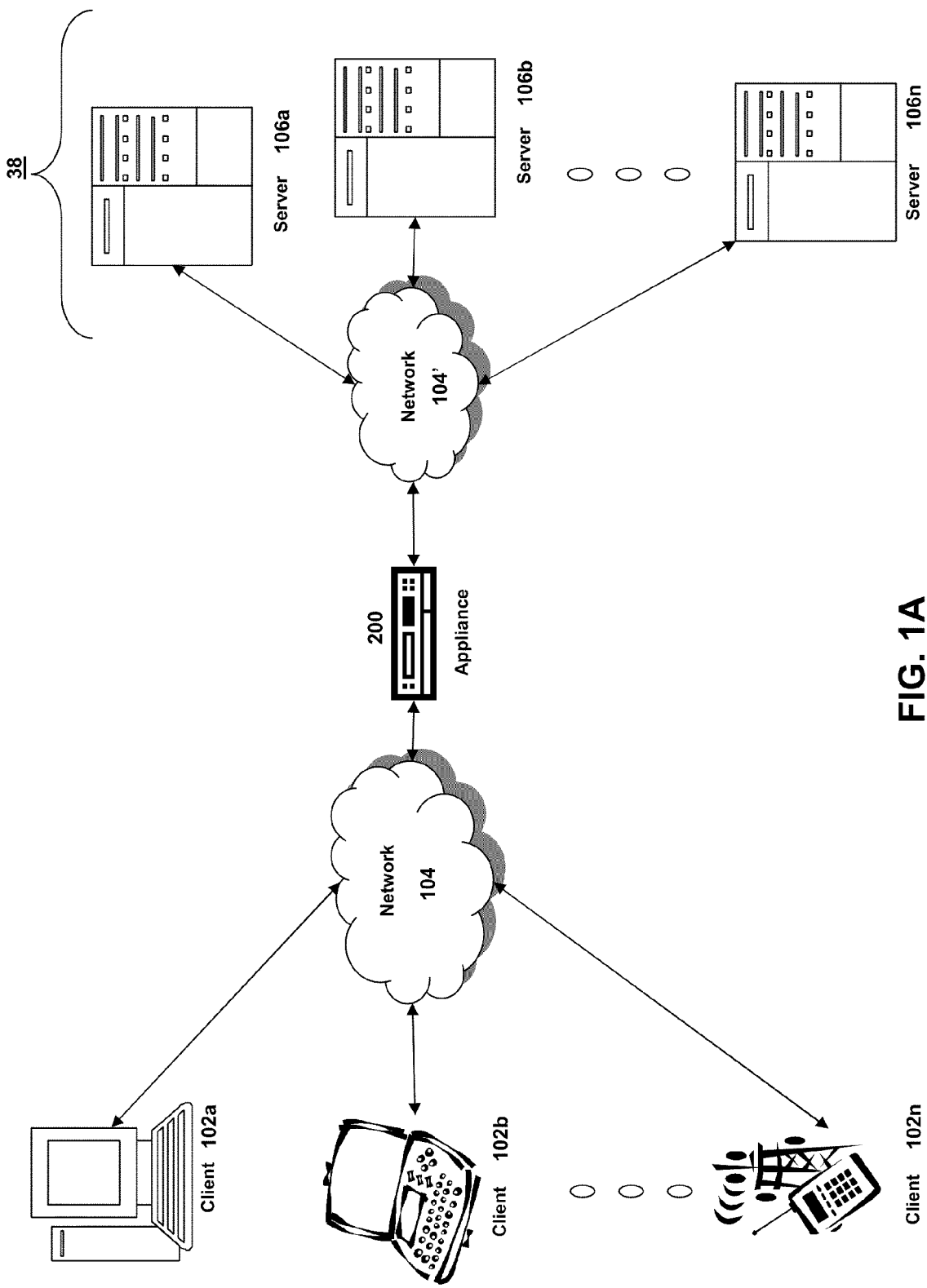
FIGS. 1A, 1B and 1C are block diagrams of embodiments of a network environment for a client to access a server via one or more appliances.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104, 104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
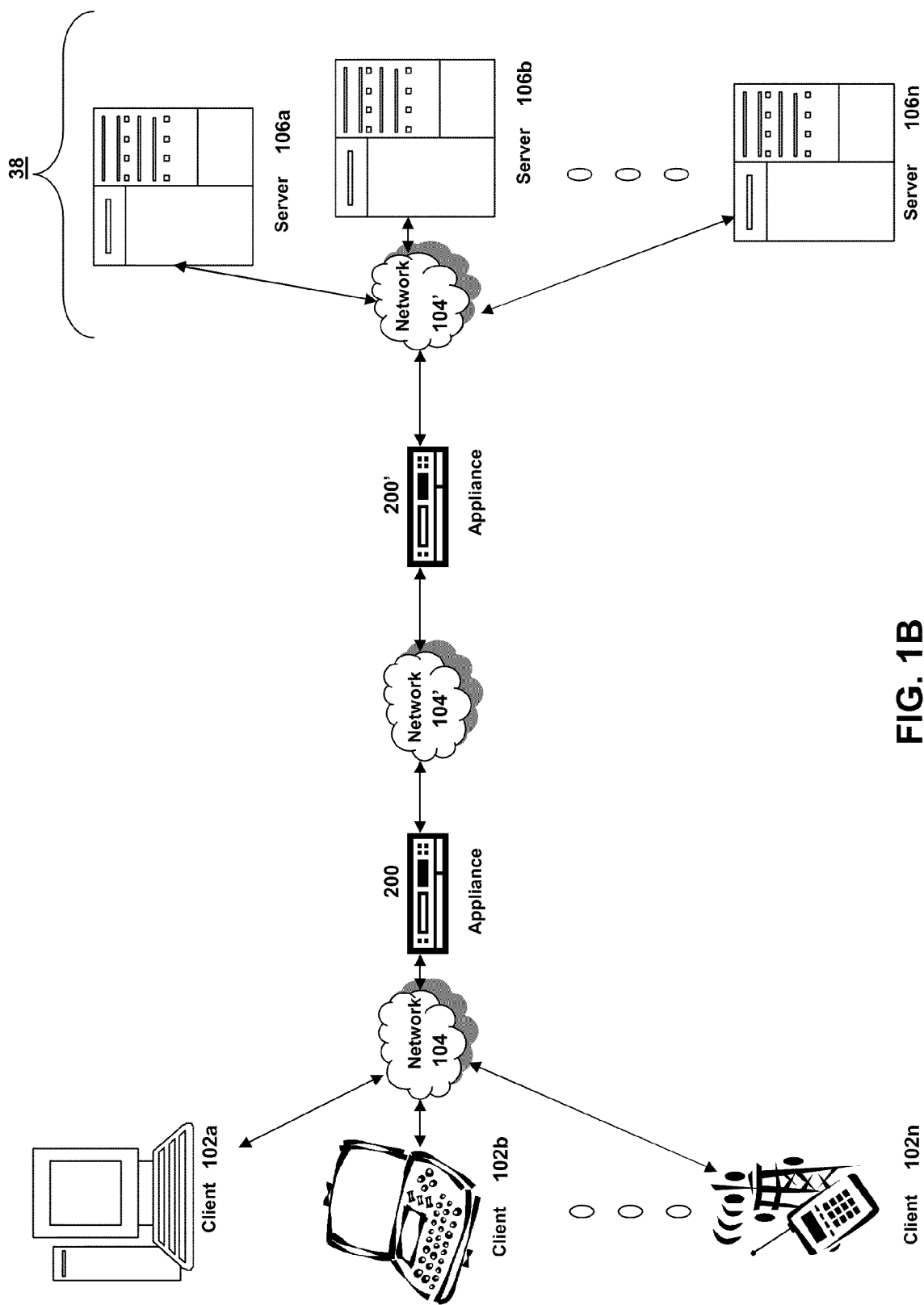
Figure 1C:
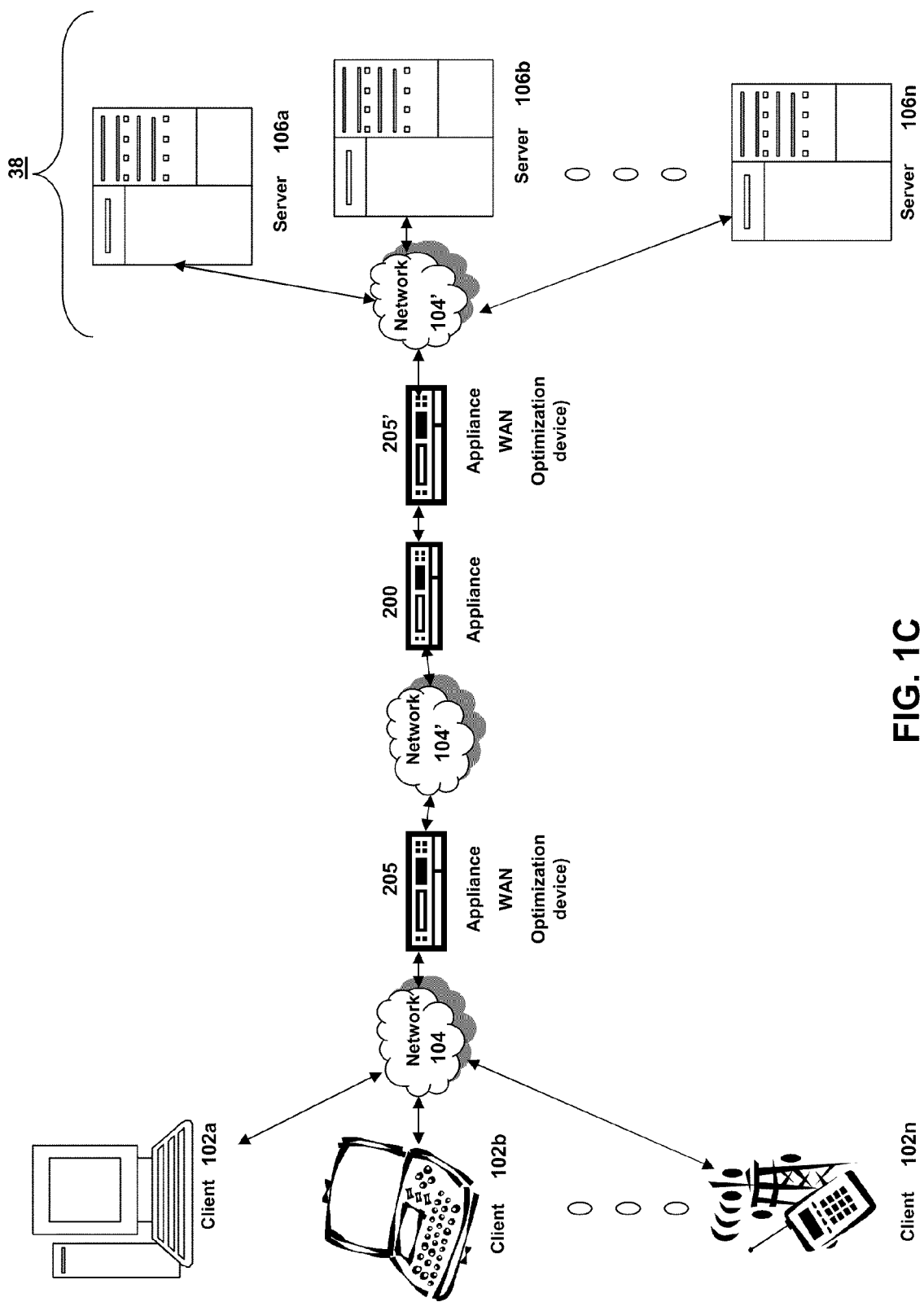

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
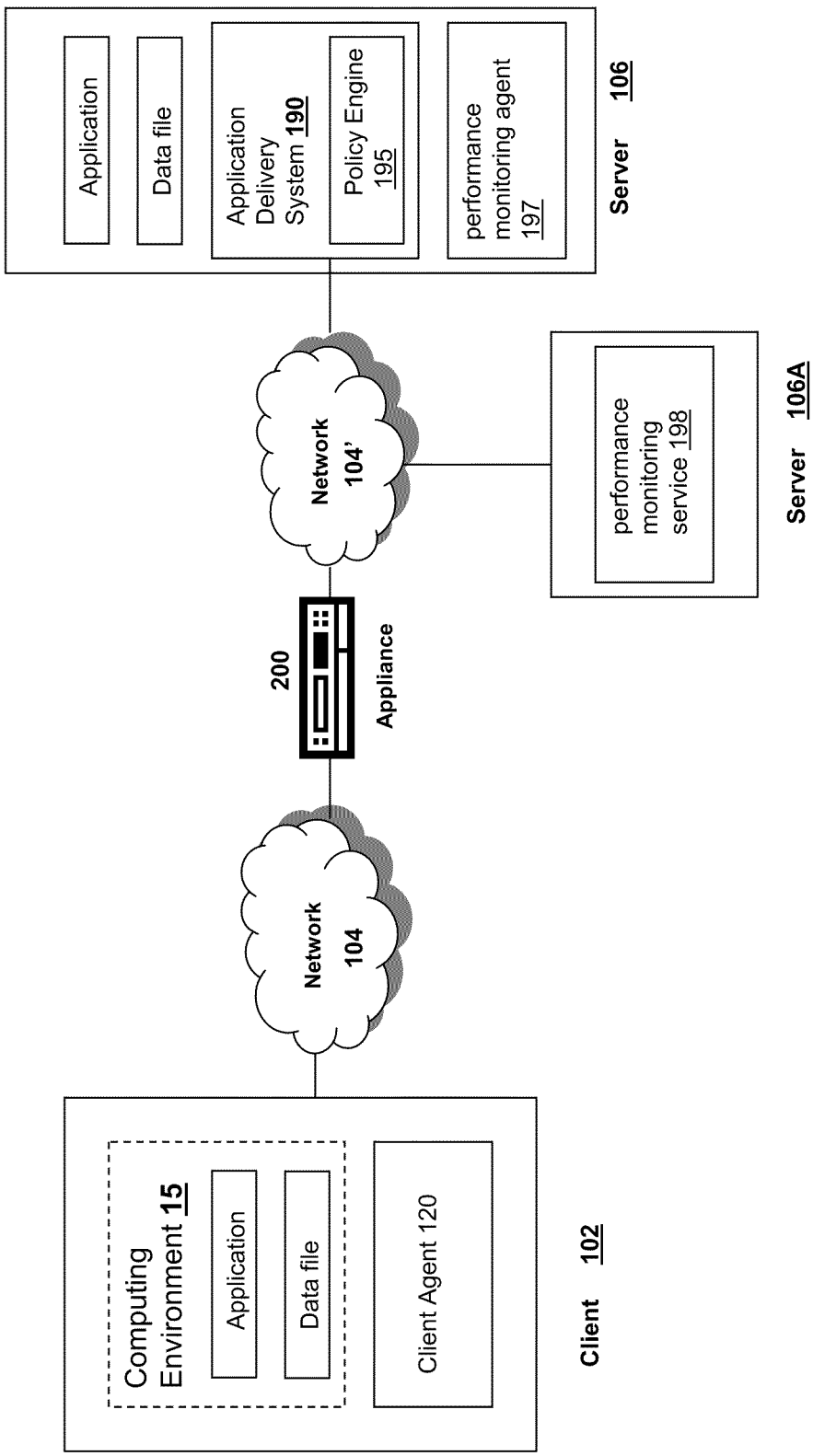
FIG. 1D is a block diagram of an embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEX™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
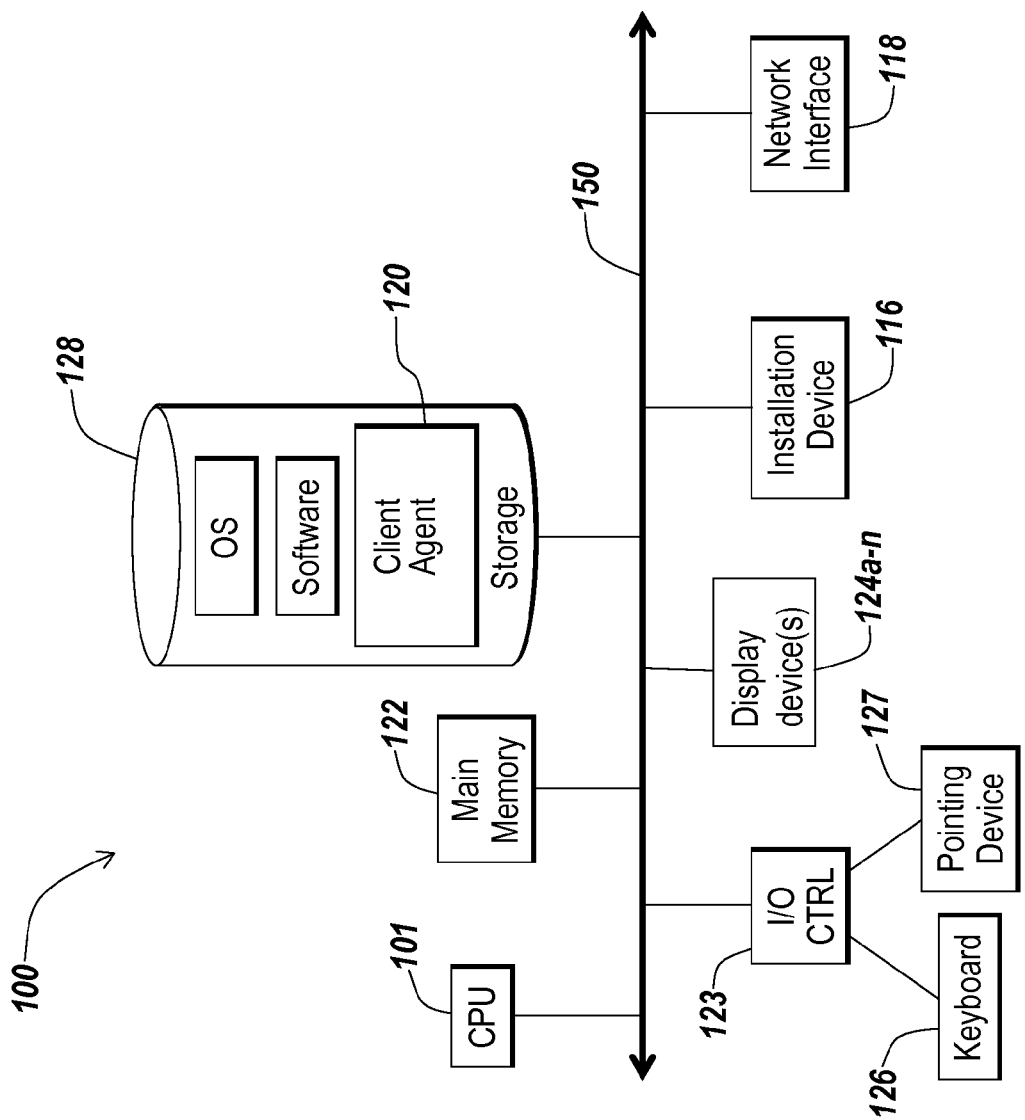
FIGS. 1E and 1F are block diagrams of embodiments of a computing device.
Figure 1F:
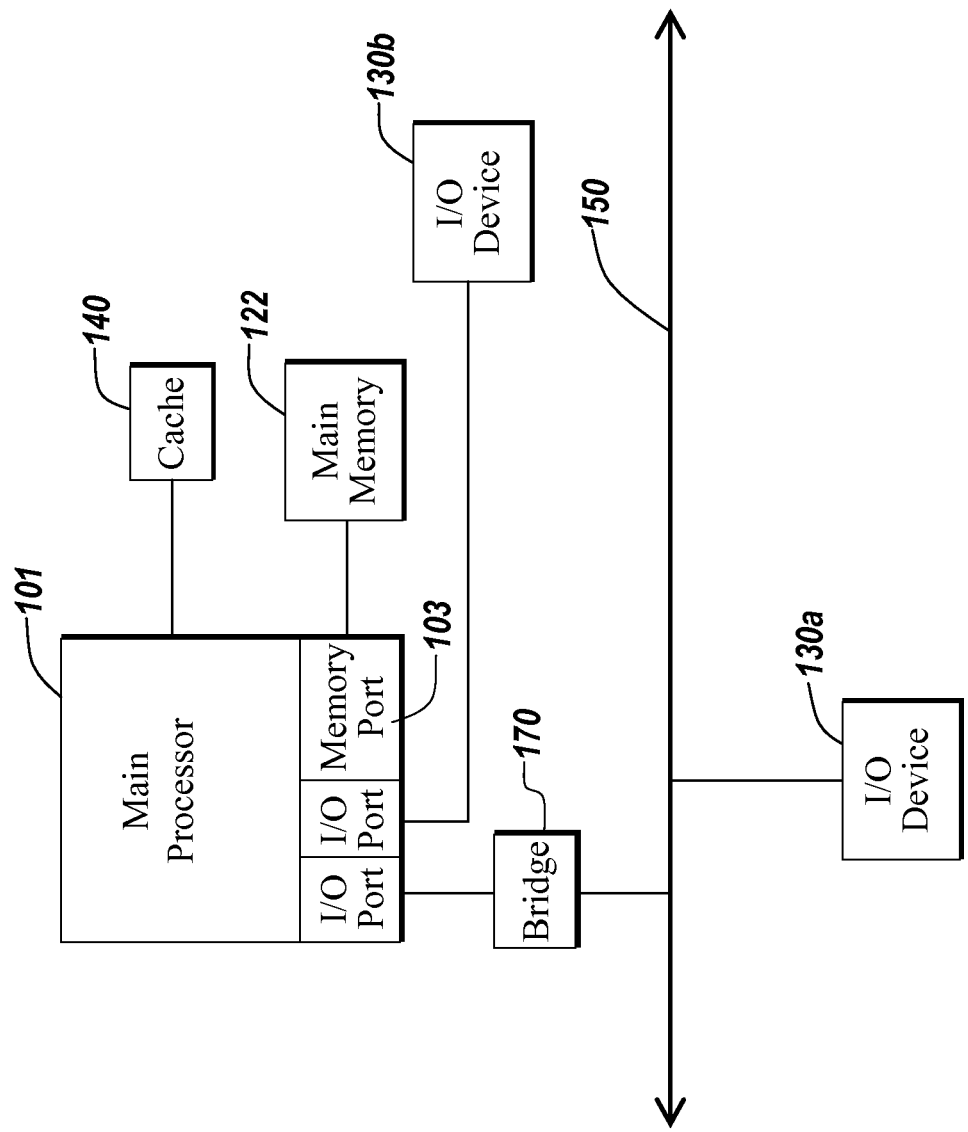

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
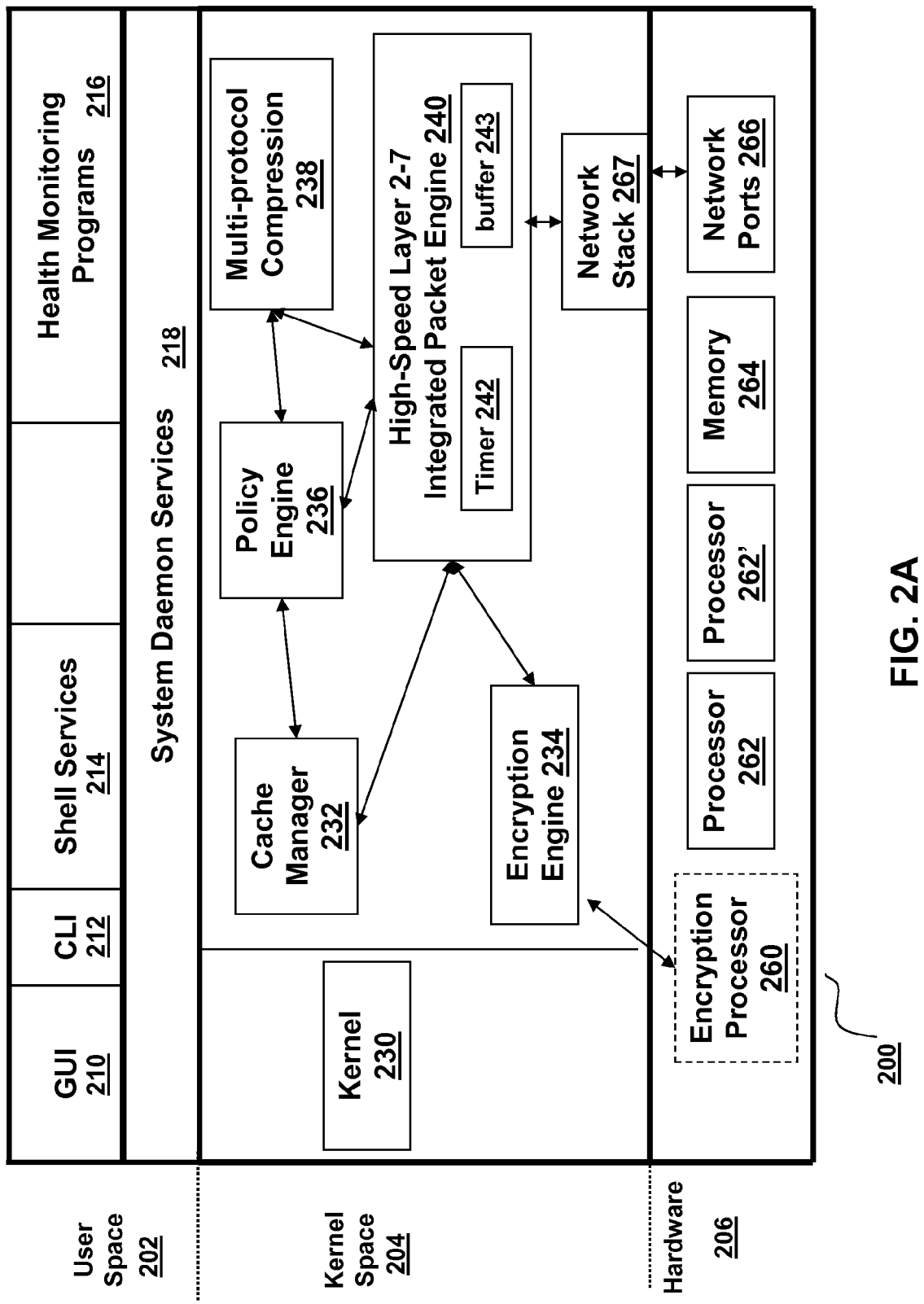
FIG. 2A is a block diagram of an embodiment of an intermediary processing communications between a client and a server.

FIG. 2A illustrates an example embodiment of the appliance 200, which may also be referred to as the intermediary 200, Proxy or Netscaler. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
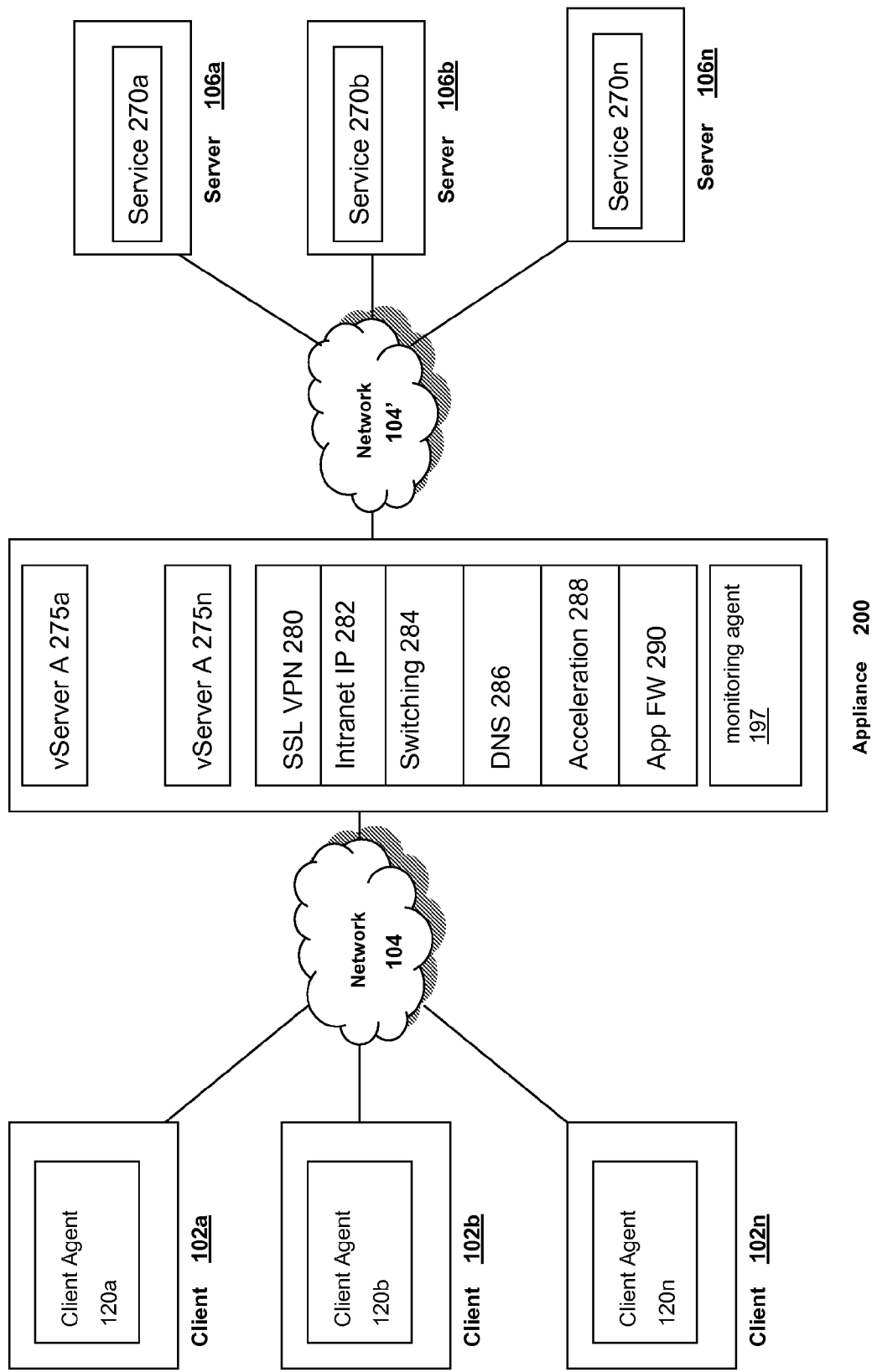
FIG. 2B is a block diagram of another embodiment of an intermediary for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an HTTP service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, HTTP server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

A virtual private network (VPN) may be any network using public telecommunication infrastructure, such as the internet, to provide remote clients, servers or other communicating devices with an access or connection into a private network, such as from a public network. A virtual private network (VPN) is a way to use a public telecommunication infrastructure, such as the Internet, to provide remote users with access to an enterprise or private network. In some embodiments, the access is secure via encryption or tunneling. In some embodiments, the intermediary described herein provides a secure virtual private network connection from a first network of the client to the second network of the server.

A Secure Socket Layer (SSL) VPN may use SSL or TLS or any other type and form of secure protocols to establish the connection with a level of security. In some embodiments, an SSL VPN may use any type and form of encryption for establishing or maintaining secure access. An SSL VPN may be established and/or accessed via a browser such as using HTTPS (Secure HyperText Transfer Protocol). An SSL VPN may be established or provided by an SSL enabled browser or application.

The SSL VPN connection or session may be established or provided by either using a client based or clientless approach A client based SSL VPN may be use any type and form of client agent or any software related agent on the client 102 to establish a SSL VPN connection or session. For example, a client based SSL VPN may be provided via an SSL VPN client agent downloaded to the client, such as downloaded from an appliance. The client agent may be designed and configured to establish and provide the SSL VPN functionality, connection and access between the client and the appliance or server.

A clientless SSL VPN may be any SSL VPN that does not use an SSL VPN client agent, software or programs downloaded and installed on the client 102 to establish the SSL VPN connection or session. In some embodiments, a clientless SSL VPN may be any SSL VPN that does not require a client 102 to install or execute a predetermined software or an executable file designed and constructed to provide SSL VPN functionality in order to establish an SSL VPN connection with another network device. In some embodiments, a clientless SSL VPN is established via an SSL enabled browser that has not downloaded or does not require the use of a VPN or SSL VPN client agent. A clientless SSL VPN connection or session may use the protocols and communications of a standard browser or application, such as an SSL enabled browser. A clientless SSL VPN connection or session may be provided by an intermediary or appliance as described herein that translates, rewrites or transforms content of requests and responses between a first network and a second network.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Clientless Virtual Private Network Environment

Figure 3A:
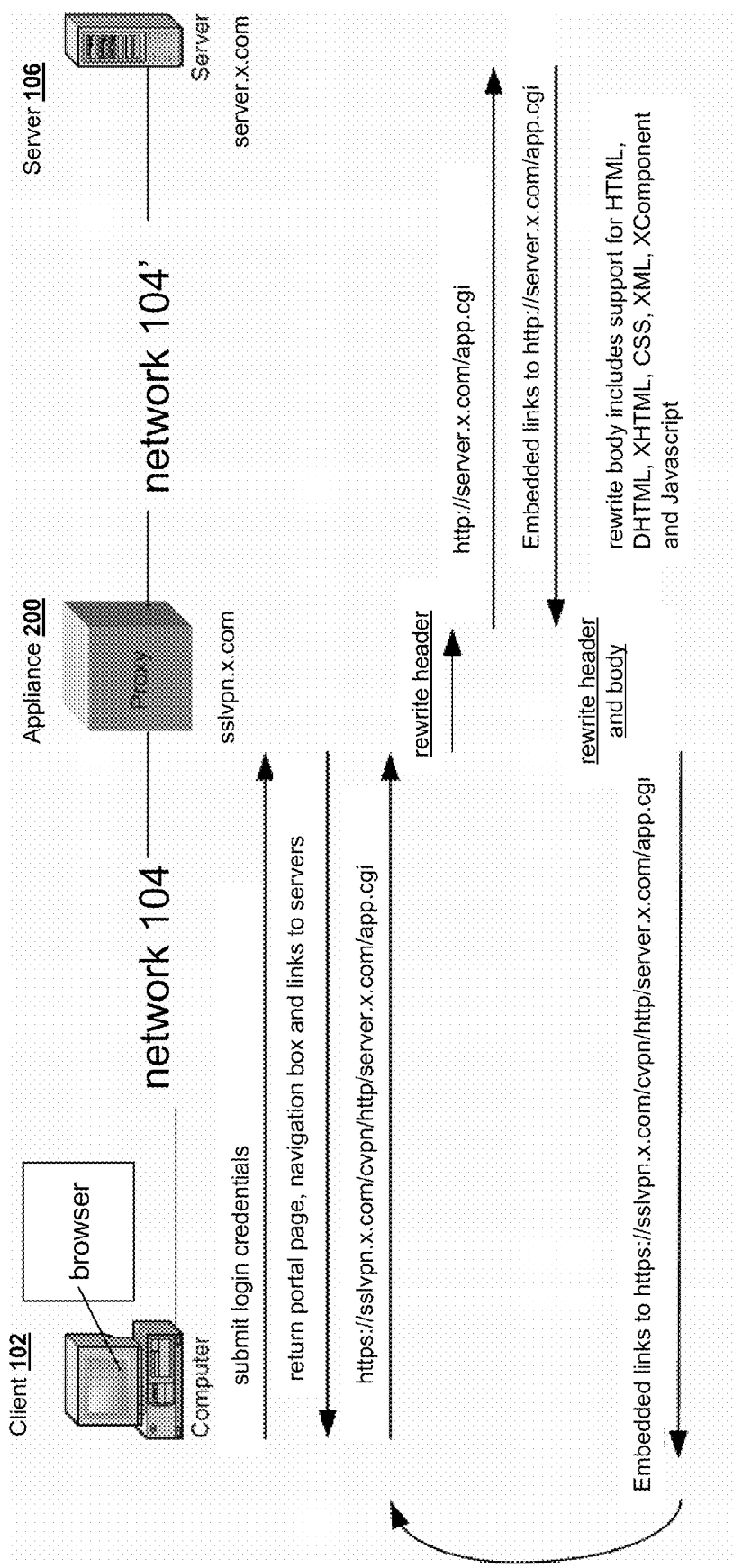
FIG. 3A is a block diagram of an embodiment of a clientless virtual private network access to a server via the intermediary.

Referring now to FIG. 3A, an embodiment of a clientless virtual private network (VPN) environment for accessing a server via an appliance 200 or proxy is depicted. In brief overview, the client 102 operates on computing device 100 and executes a browser operated by a user. The client 102 may be on a first network 104, such as a public network. A user on the client 102 may request via the browser access to a resource on a second network 104', such as a private network of an enterprise. The appliance 200 provides the user a clientless VPN access to the requested resource. The client may not install, execute or otherwise any agent, component, program, driver or application that is constructed and/or designed to provide VPN connectivity (referred to as client based VPN) to the network 104'. Instead, the appliance or proxy may rewrite responses from the server and requests from the client to provide VPN functionality without the user of a VPN agent operating on the client. For example, the appliance may rewrite Uniform Resource Locators (URLs) between the client and server, such as URLs in any content server by the server or requests transmitted by the client. The appliance 200 may rewrite URLs between the client and the server in a manner transparent and seamless to either or both of the client and the server. As such, the client, browser or server and server application do not need to have knowledge or be aware of the clientless SSL VPN access scenario.

The appliance 200 may provide via an SSL VPN 280 module, previously described herein, a facility for accessing a resource. In one embodiment, the appliance 200 provides a client based access to a network by providing, installing or executing an SSL VPN agent on the client 102 for communicating with the appliance 200. In some embodiments, the appliance 200 provides for clientless SSL VPN access to a resource, such as an http/https/file share, without having to download an SSL VPN client or agent to the client 102. For example, a user may want to access the resources within company from an outside machine such at a kiosk on which he does not have privilege to install the client or does not want to go through the client installation process. The clientless SSL VPN feature is also useful when the SSL VPN client is not supported for the device (e.g. new PDA in market) but the device run an SSL enabled browser. In other embodiments, the appliance 200 chooses for a user between client-based and clientless SSL VPN access to the resource based on policy and any policy rules, actions and/or conditions.

The client may include any type and form of user agent which may be a browser, editor, spider (web-traversing robots), or any other end user tool or program. The client 102 may include any type and form of browser. In one embodiment, the browser is any version of Internet Explorer manufactured by Microsoft Corporation of Redmond, Wash. In another embodiment, the browser is any version of the Netscape browser manufactured by the Netscape Communications Corporation. In other embodiments, the browser is any version of the open source browser referred to as Firefox and provided by Mozilla Foundation of California and found at www.mozilla.com. In yet another embodiment, the browser is any version of the browser referred to as Opera manufactured by Opera Software ASA of Oslo, Norway. In some embodiments, the client 102 executes or includes any type and form of application or program for displaying web pages, web content, HTML, XML, CSS (Cascading Style Sheets), JavaScript or HTTP content.

In operation of the embodiment depicted by FIG. 3A, a user logs in at the SSL VPN site provided by the appliance 200, such at a domain name and IP address hosted by the appliance 200. For example, the user via a browser of the client 102, may select or enter a URL to the SSL VPN site. The appliance 200 may authenticate the user and may further determine authorization of the user to access the appliance 200 or the SSL VPN site. After successful authentication, the appliance serves a portal page to the client to display to the user via the browser. The portal page may include a navigation box, such as a set of one or more user interface elements for a user to select to operate or run an application. The portal page may include links to other pages or URLs to which the user may have access. The URLs or links on the portal page may reference or identify the host name or IP address of the SSL VPN site provided by the appliance 200.

The user via the portal page may select one or more URLs, for example, by clicking on an active hyperlink or URL. In response, the browser or client transmits a request to the domain hosted by the appliance 200. For example, as depicted in FIG. 3A, the user may request an application of the server 106 via the appliance: "https://sslvpn.x.com/cvpn/http/server.x.com/app.cgi". In some embodiments, the user sends another request, such as for example "https://proxy.x.com/cvpn/http/server.x.com/app.cgi". The appliance 200 receives the request from the client 102 and rewrites the request to transmit to the server. For example, as depicted in FIG. 3A, the appliance may remove or strip the domain name hosted by the appliance such as "sslvpn.x.com" or "proxy.x.com" and forward the remaining portion of the request to the server 106.

In response to the request, the server serves content to the client. The content or body of the response may include embedded links or URLs to other pages of the server or to other servers on the network 104', such as embedded links to "http://server.x.com/app.cgi". The appliance rewrites the header and body to modify any URLs to reference the domain name or IP address of the SSL VPN site so that any further URL or link selection via the browser of the client communicates requests to the appliance 200. The appliance communicates the modified content to the client 102. The appliance 200, such as via the AppFw 290, sometimes referred to as AppSecure module 290, may be designed and constructed to rewrite URLs of requests and responses based on policy of a policy engine. The links (URLs) in that page and other pages received subsequently from the server during this SSL VPN session are modified by the appliance in such a way that the links point to the SSL VPN site (VPN VIP 275) and the original request URL (absolute or relative) is encoded within that request URL.

Figure 3B:
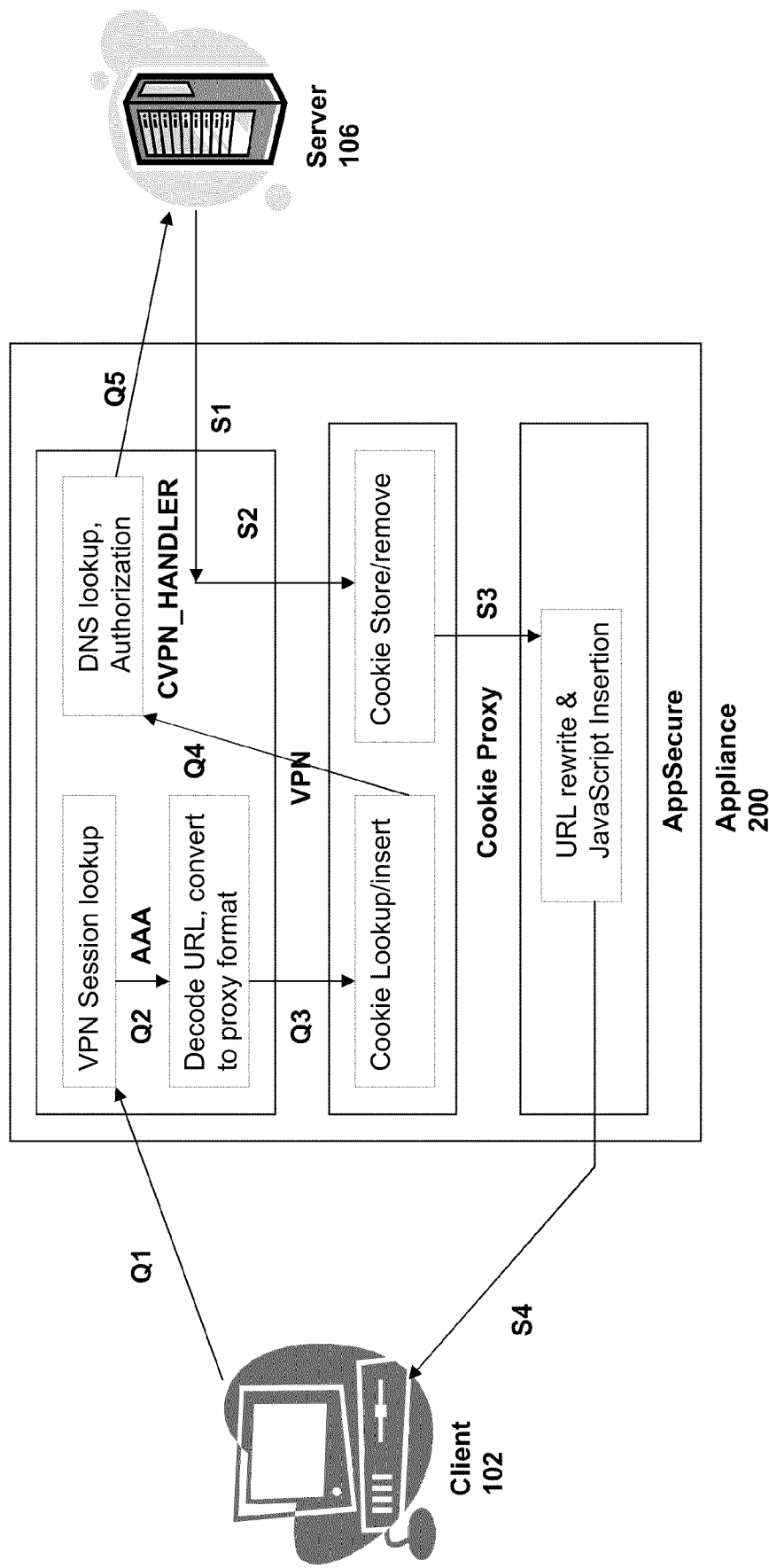
FIG. 3B is a block diagram of another embodiment of a clientless virtual private network access to a server via the intermediary.

Referring now to FIG. 3B, another embodiment of a VPN environment for providing VPN access as well as cookie management is depicted. In brief overview, the appliance 200 may include a VPN module 280 for handling any of the SSL VPN functionality, clientless and/or client based, as described herein. The appliance and/or VPN module 280 may have an AAA module to perform any type and form of authentication, authorization and auditing (AAA) and/or to track and manage VPN session information. The AAA module may also perform any type and form of VPN session look to determine the VPN session for any client request. The VPN module may also perform an URL decoding and covert the URL to server format, such as to submit to a server on the private network. VPN module 280 also includes DNS lookup functionality and authorization via VPN handler function, logic or operation.

The appliance may include a cookie proxy or cookie manager for storing, tracking and managing cookies between the client and the server. The cookie may include cookie storage, referred to as a cookie jar for adding or inserting cookies as well as removing cookies. The cookie manager or proxy may include functions, logic or operations to store and look up cookie information in a cookie jar by URL, domain name or other information of the request and/or response. In some embodiments, the appliance 200 manages cookies on the behalf of clients that do not support cookies, disabled cookies or for cases where it may be desired or preferred not to send cookies to the client.

The appliance may also include an AppFW 280 also referred to as AppSecure in the context of an appliance manufactured by Citrix Systems, Inc. The AppSecure 280 module may include logic, functions or operations for perform any type and form of content rewriting, such as URL rewriting. In some embodiments, the AppSecure 280 module performs any type and form of content injection into a request and/or response between a client and a server. In one embodiment, the AppSecure module 280 injects scripts into a response to the client, such as a JavaScript, to perform any type and form of desired functionality.

Any of the components of the appliance 200 used for clientless SSL VPN access may be responsive to or driven by configuration, such as via any one or more policies of the policy engine. The policies may direct and determine the type and form of URL encoding and decoding performed by the VPN module. In some embodiments, the policies may direct and determine how and when the cookie proxy manages and proxies cookies. In other embodiments, the policies may direct and determine how and when the AppSecure module performs URL rewriting and/or content injection. The policies may direct the way a user access the private network and applications on the private networks. Policies may be configured based on access scenarios, which can include access based on any combination of a user, type and form of client, type and form of network, type of resources accessed, types of applications used, temporal information as well as any information that may be determined by the appliance via network traffic traversing thereto.

With reference to FIG. 3B, a flow of packets via the appliance 200 for clientless SSL VPN access is discussed. In response to a successful login request, the VPN appliance may send a portal page to the sender of the login request. The portal page may have one or more links in "vpn encoded form" as described in connection with FIG. 3A. The portal page flows through the response code path described below. When a user clicks on any of the URLs in the portal page, the packet flow may be implemented in a number of ways and using a number of steps. In some embodiments, for request path at step Q1, the appliance 200 may receive a URL request and look up the VPN session in the AAA module. At step Q2, the appliance may decode the VPN encoded URL to the expected URL for the server or the network 104'. The appliance may also modify the header of the request, such as the header values, to server format, or a format intended for transmission and use by the server 106, such as the HTTP server for example. The appliance may reparse the header so that any other modules of the appliance see the request in the server format. At step Q3 in the request path, the appliance via the cookie manager or proxy may look up the cookie for the request based on the domain and path of the URL. In some cases, if the request should include a cookie, the appliance may insert the cookie from a cookie jar. At step Q4, the appliance may resolve the domain name of the server present in the URL into an IP address of the server via a DNS lookup function/module of the appliance. The appliance may create server information based on the DNS lookup in the AAA module. In addition, authorization policies may be evaluated to determine if the request may be transmitted to the server. At step Q5 the appliance may send the request to the server. In some embodiments, the appliance sends the request to the server provided that the authorization is successful.

In the response path from the server to the client via the appliance, at step S1, the appliance may receive the response from the server. The VPN module 280 may process the response. The VPN module may pass the response header to the cookie proxy module and the response body to the AppSecure module. At step S2, the cookie proxy may remove cookies from the header of the response that are not configured or otherwise identified as client consumed cookies and store them in a cookie jar used for the current session. At step S3, the AppSecure module may rewrite any URL in "vpn encoded form" as per rewrite policies. The AppSecure module may also insert into the response body any scripts, such as JavaScript code to be executed at client side. At step S4, the appliance may send the modified response to the client. In many embodiments, any of the Q or S steps happen in any order or in any combination with any other steps or embodiments described herein.

D. Systems and Methods for Fine Grain Policy Driven Cookie Proxying

Cookies may be used for maintaining a state of a system or a memory of a previous event, transaction or communication between two entities on a network. In some cases, cookies may be utilized for various types of session tracking. Cookie management may be referred to as a feature of a network device, such as an intermediary 200, and may provide a way to manage a server 102 or a client 106 in creating, utilizing or controlling cookies transmitted between the server 106 and the client 102. Embodiments of the intermediary described herein provide ways to manage cookies for the client and the server. In some embodiments, the intermediary manages server consumed cookies on the server-side while not sending cookies to the client browser.

Figure 4A:
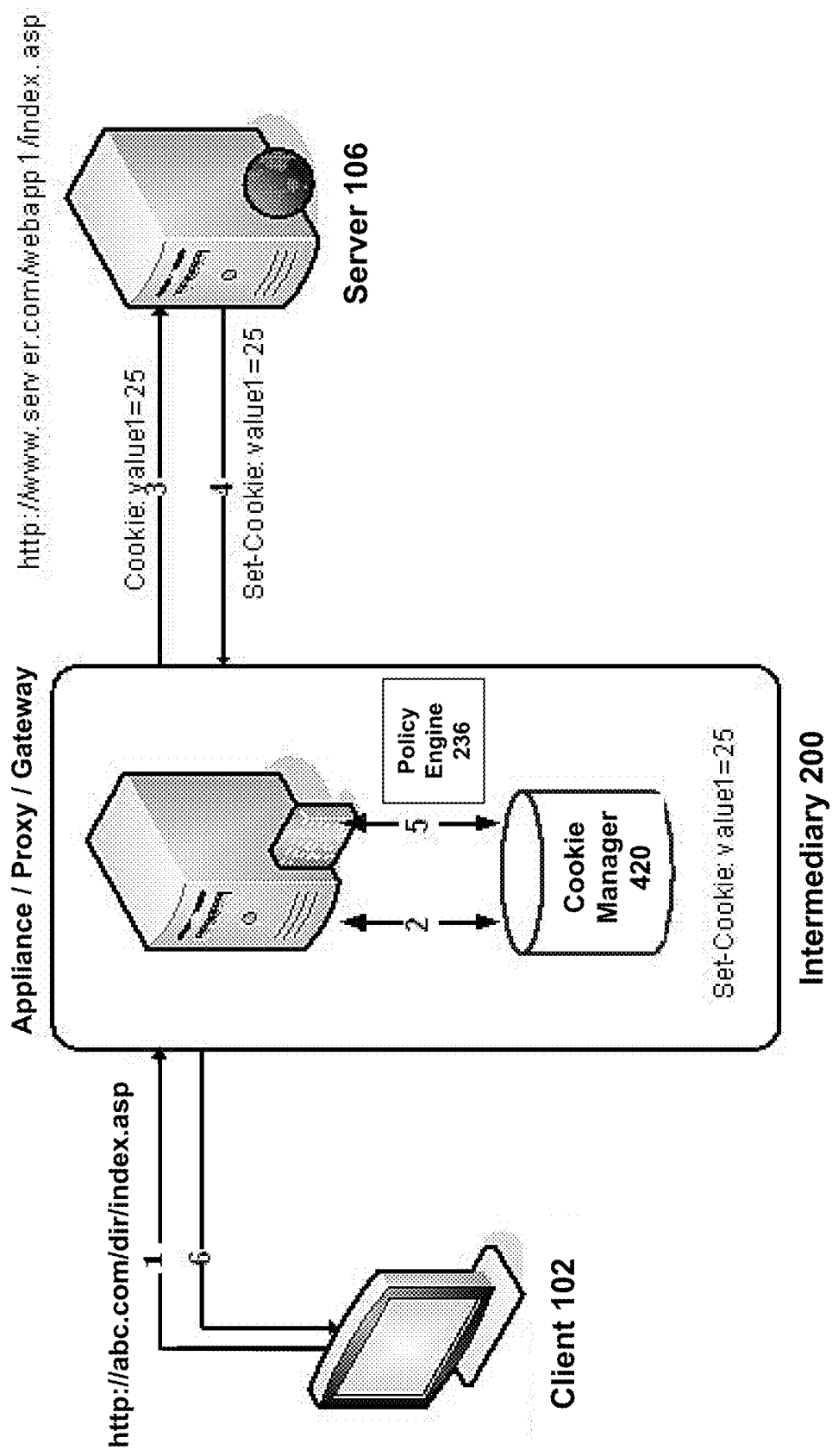
FIG. 4A is a block diagram relating a number of embodiments of cookie management.
Figure 4B:
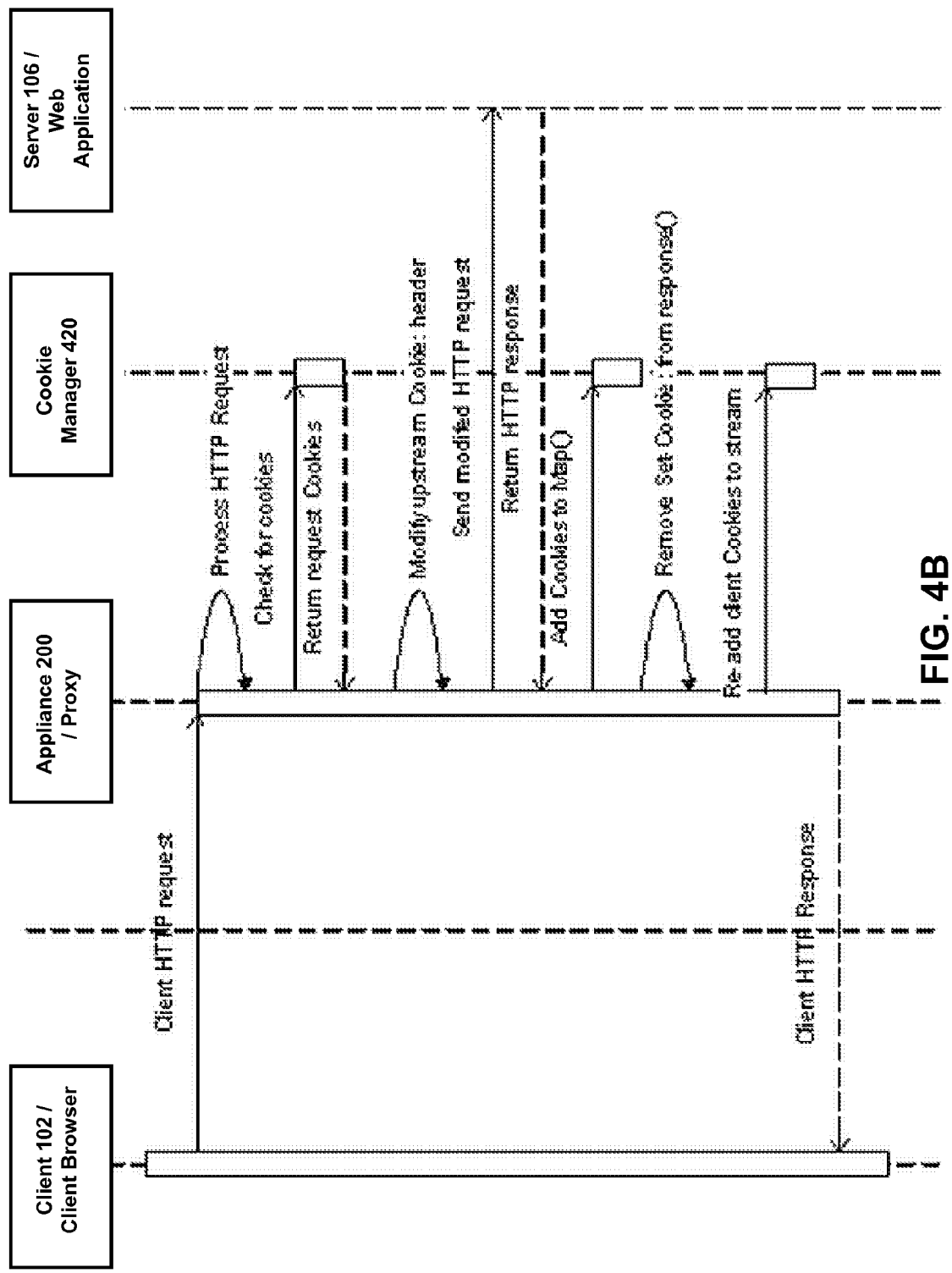
FIG. 4B is a block diagram presenting a number of management sequence diagrams utilized in cookie management.
Figure 4C:
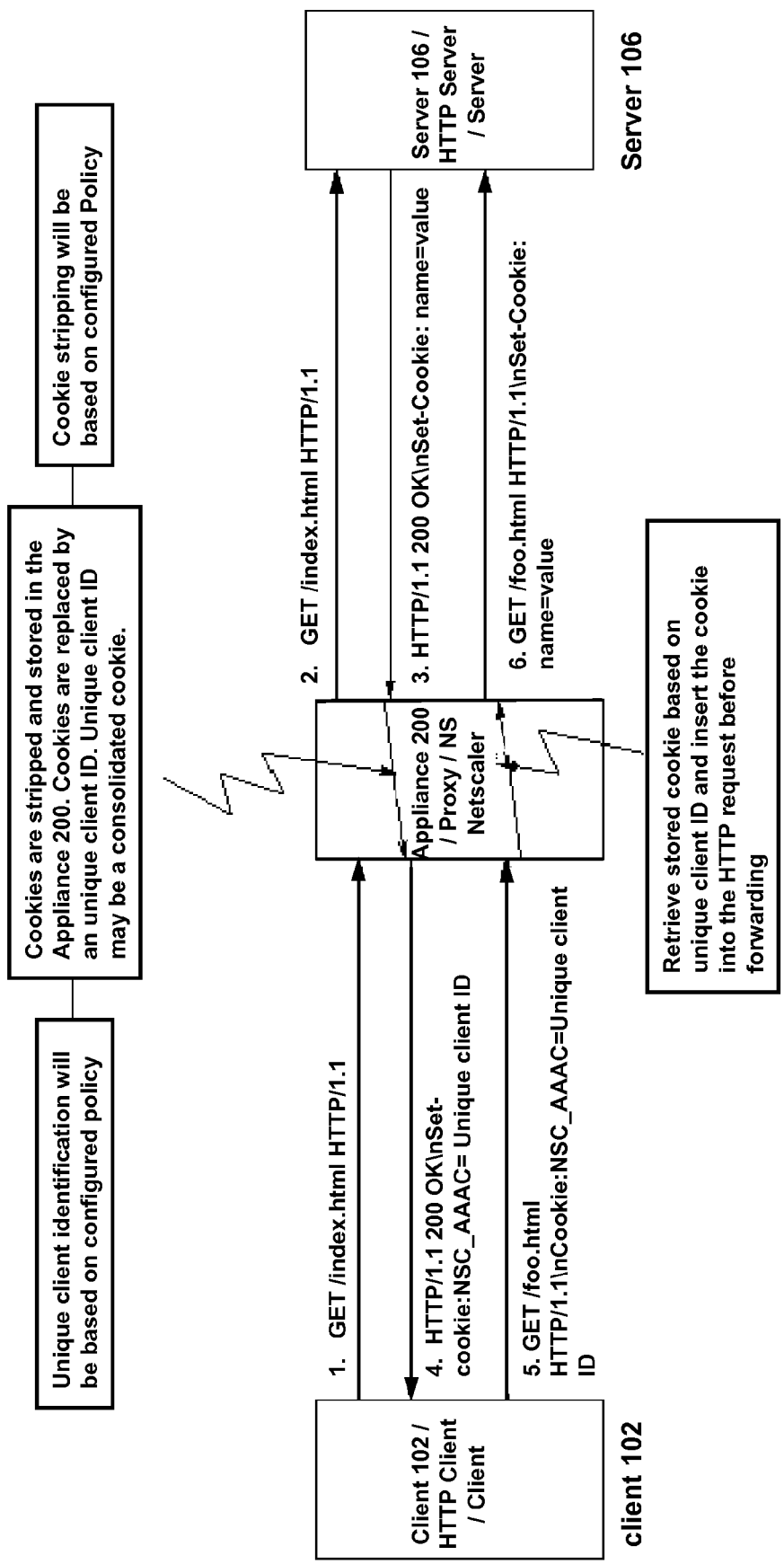
FIG. 4C is a block diagram presenting a number of embodiments of cookie proxy data flow, including the methods relating to cookie proxying.

Systems and methods for cookie proxying are illustrated by FIG. 4A, FIG. 4B and FIG. 4C. FIG. 4A depicts an embodiment of a system and a method for managing cookies in an embodiment of a clientless SSL VPN environment. FIG. 4B illustrates sequence diagrams and steps of an embodiment of a method for cookie management that includes a SSL VPN clientless access scenario. FIG. 4C depicts embodiments for cookie proxying by an intermediary that utilizes a unique identifier, such as a unique client ID. These illustrations may relate to a number of embodiments of systems and methods for implementing cookie management, such as a clientless cookie management.

Clientless cookie management may enable a web client that resides within an unsecured network to access a web application hosted behind a secured network without compromising the security of the secured network. For example, clientless cookie management may improve security for the transmitted information by removing server consumed cookie data. Clientless cookie management may disable the server consumed cookie data from being transmitted to the client and prevent accessibility to any sensitive information which may be included in the cookie. In addition, clientless cookie management may enable web browsers that do not support cookies, such as PDAs and WAP browsers to work with web applications on the servers that require cookies. Furthermore, in instances when web applications used are not compatible with cookie path rewriting, clientless cookie management may provide a service allowing such applications to function by rewriting the cookie path.

Referring now to FIG. 4A, an embodiment of a system and method for implementing SSL VPN clientless cookie management via an intermediary 200 is illustrated. FIG. 4A depicts a client 102 communicating with a server 106 via an intermediary 200. The intermediary 200 includes a policy engine 236 and a cookie manager 420. Client 102 transmits a request, such as an HTTP (hypertext transfer protocol) request intended for the server 106 to the intermediary 200. The request includes a URL (uniform resource locator) which may identify a service or a resource stored on or otherwise available from a server 106. Cookie manager 420 receives the request and generates a cookie associated with the client 102 using the policy engine 236. The generated cookie may satisfy any preferences or configurations of the server 106, thus enabling the initially cookie-less request to be accepted and processed by the server 106. Cookie manager 420 modifies the request to include the cookie forwards the modified request to the server 106. Server 106 issues a response to the request and transmits the response to the intermediary 200 using the cookie generated by the cookie manager 420. Cookie manager 420 modifies the response by removing the cookie. The modified response is then transmitted to the client 102. The server 106 and client 102 may further transmit additional requests and responses using the cookie, thus allowing the cookie-less client 102 to access the resources on the cookie-configured server 106.

A cookie manager 420 may be any device, component, unit, function or an apparatus generating, terminating, modifying or managing cookies. Cookie manager 420 may also modify requests of the clients 102 and responses of the servers 106. Cookie manager 420 may comprise hardware, software, or any combination of hardware and software components to manage and control cookies. A cookie manager 420 may comprise logic, control functions, processing circuitry, software programs, algorithms and scripts to control, manage or modify transmission between the clients 102 and servers 106. In a number of embodiments, cookie manager 420 comprises policies utilized during the process of managing cookies and providing the control of communications between the client 102 and the server 106.

In some embodiments, cookie manager 420 may uniquely identify a user on a network, for example by providing a unique identifier using a configured policy, such as a policy of a policy engine 236. Unique identifier may be any number, value or a set of data, numbers or characters uniquely identifying a client 102, a server 106 or an appliance 200 on the network. In some embodiments, cookie manager 420 may utilize the unique identifier to associate a received response from the server 106 with the specific client 102 to which the response is intended. Cookie manager 420 may include any functionality to modify the response using the cookies and client identifiers such that the client 102 receives the response in a desired format. Similarly, cookie manager 420 may include any functionality to modify the request of a specific client 102 to include a specific cookie to access a resource on the server 106 using the client unique identifier and the cookie generated for the client.

Cookie manager 420 may modify or change any transmission sent by a server 106 or a client 102. In some embodiments, cookie manager 420 modifies transmissions between the client 102 and server 106 using one or more policies for handling cookies of a policy engine 236. Cookie manager 420 may modify the transmissions to include or exclude the cookies and unique client identifiers. In some embodiments, cookie manager 420 generates cookies for any client 102 requesting access to any servers 106. Cookie manager 420 may generate the cookie for the clients 102 in response to a policy. In some embodiments, cookie manager may determine that a particular client should not be allowed a cookie in response to a policy. In other embodiments, cookie manager 420 determines that a particular unique client identifier should be associated with the client 102 in response to a policy. In further embodiments, cookie manager 420 determines a type and form of the cookie to generate for the request in response to a policy. In yet further embodiments, cookie manager determines if and how will the cookies be stored for the future requests of the client in response to a policy.

In some embodiments, cookie manager eliminates or strips the cookies from the requests or the responses. Cookie manager may assign or reassign cookies to the clients 102 or servers 106. In still further embodiments, cookie manager 420 changes, modifies or rewrite cookies from the requests from the clients 102 or responses from the servers 106. Cookie manager 420 may match a value, a name or a unique client identifier uniquely identifying a client to a cookie or a portion of the cookie associated with a client, a server or an intermediary 200. In some embodiments, cookie manager 420 may add a cookie associated with the unique client identifier to the URL. In further embodiments, cookie manager 420 may remove the unique client identifier and add a cookie associated with the unique client identifier instead. In a number of embodiments, cookie manager 420 may replace a cookie with a unique identifier, sometimes also referred to as a unique ID uniquely identifying a client 102 or a server 106.

The cookie manager 420 may use a parser for parsing the transmissions. Cookie manager 420 may also use an internal map for matching a plurality of unique identifiers relating a plurality of clients, servers or appliances 200 to a plurality of cookies relating the clients, servers or the appliances. For example, the cookie manager 420 may utilize a map comprising a unique identifier associated with one or more cookies for matching a client 102 uniquely identified by the unique identifier with the one or more cookies. In such cases, the cookie manager 420 may modify, change or edit a request from the client or a response to the client using the one or more cookies matched to the unique client identifier. Cookie manager 420 may utilize policies to manage transmissions between a client 102 and a server 106 by managing, adding or removing of the cookies and unique client identifiers to and from the transmissions of the clients 102 and servers 106 as necessary to comply with configurations or preferences of receiving devices, i.e. the clients 102 and servers 106 receiving the transmissions.

A semi-colon client delimited list may be any map, list, database or file comprising a list of cookies along with information associated with clients 102 that communicate with one or more servers 106 via the intermediary 200. Semi-colon client delimited list herein may also be interchangeably referred to as an internal map or a list of cookies or the map. In some embodiments, the semi-colon client delimited list comprises name value pairs of cookies and values or unique identifiers which may be used instead of the cookies for upstream communication, i.e. communication towards the server 106, or downstream communication, i.e. communication towards the client 102. Sometimes, cookie manager 420 may use a semi-colon delimited list of the client consumed cookies and/or the client and server consumed cookies to link, match or associate values or unique identifiers of or more clients 102 to each of the cookies associated with the clients. By using the semi-colon delimited list, the cookie manager 420 may determine which cookies to re-inject, add or include into the downstream or upstream transmission. Cookie manager 420 may use the map or list of cookies to match a cookie from a transmission received by the intermediary 200 to the client 102 to whom the transmission is destined for. The cookie manager 420 may then edit or modify the transmission to exclude the cookie and include any other information associated with the client 102 instead. Similarly, cookie manager 420 may use the map or the list of cookies to match a unique client identifier with a cookie to include into the transmission.

In some instances, by turning on server side cookie management and not specifying the semi-colon delimited list, web applications may function incorrectly. Using the semi-colon delimited list may disable this error which may occur when a cookie manager 420 filters the client consumed cookies at the server 106. Using the semi-colon delimited list may also disable the error which may occur when a web application attempts to access a cookie value on the client 102 resulting in an unexpected behavior. In a number of embodiments, the delimited client cookie list, or the list, may comprise various on/off settings for server side or client side cookie management. In some embodiments, the delimited client cookie list may be stored in any number of data-layers or in various tables comprising settings and configurations for any variable at each step of the method or process.

Cookies may be classified by types or characteristics. Cookie manager 420 may classify or sort cookies by unique identifiers associated with the cookies. A server consumed cookie may be a cookie set by a resource, such as a server 106, issuing a Set-Cookie on the response. The server consumed cookie's values may be checked or may be not checked by any client side code. In certain embodiments, cookie manager 420 may identify or classify a server consumed cookie as a server consumed cookie. In a number of embodiments, cookie manager 420 may remove a server consumed cookie from a downstream transmission of a request or a response and re-inject them into an upstream transmission which is related to the request or the response. In other embodiments, server consumed cookies may be associated with confidential or sensitive data pertaining to sessions. In some embodiments, server consumed cookies may be managed by a cookie manager 420 and may not be sent to a web browser. In certain embodiments, server consumed cookies may be stripped from the message being sent to the web browser and may be stored in the cookie manager 420 or any storage device related to the cookie manager 420.

A client consumed cookie may be a cookie such as a cookie that is set on an upstream transmission by a client 102's web browser via a script such as JavaScript. In some embodiments, a client consumed cookie is a cookie that is set on a downstream transmission from the source, where the source may be a client 102, a server 106 or an appliance 200. In a plurality of embodiments, a client consumed cookie may be checked or modified by the client 102 or the intermediary 200. In some embodiments, client consumed cookies are not checked or modified by the server 106. The server 106 may only accept the requests as they are and may rely on the intermediary 200 to provide the modification to the requests. Similarly, clients 102 may also not modify responses, but may instead rely on the intermediary 200 to modify the responses. In some embodiments, client consumed cookies are checked, edited or modified by the server 106. In further embodiments, a client consumed cookie is not managed by the cookie manager 420, but is instead sent downstream to the web browser of the client 102 instead. Sometimes, client consumed cookies and server consumed cookies may be read, modified and generated by both the client 102 and the server 106. In some embodiments, cookie manager 420 may not manage a client or server consumed cookie, and client or server consumed cookies may be sent downstream toward the web browser of the client 102. In some embodiments, a client 102 may perform the functionality of a server 106, and vice versa. In other embodiments, a client 102 may be used interchangeably instead of a server 106, and a server 106 may be used interchangeably instead of a client 102. In some embodiments, client or server consumed cookies may be used, modified, read, written transmitted to or from any one of the client 102, server 106 or an intermediary 200. In many embodiments, server consumed cookies comprise all functionality of client consumed cookies and may be treated, modified, controlled or otherwise used in the same way and by same components as any client consumed cookies. Sometimes, all cookies may be server consumed cookies. The server consumed cookies may be used, read or edited by the server. In further embodiments, some server consumed cookies are also client consumed cookies. The client consumed cookies may be used, read or edited by the client in addition to being used, read or edited by the server. In some embodiments, the server and client consumed cookies are used, edited, read, written to, or modified by the intermediary 200. Sometimes in some embodiments, some cookies are used by the client and not used by the server.

The upstream or the downstream communication may be used to indicate the direction of the communication. For example, sometimes the upstream request communication or the upstream direction may relate to a communication or transaction from the client 102 toward the server 106. In some embodiments, upstream request communication or the upstream direction may relate to communication or transactions from the server 106 to the client 102. In a number of embodiments, the downstream request communication or the downstream direction may, in some embodiments, relate to communication, transactions or direction from the client 102 toward the server 106. In a plurality of embodiments, downstream request communication or the downstream direction may relate to communication or transactions from the server 106 to the client 102. Sometimes, transactions or communication headed toward the server may be referred to as an upstream transaction or upstream communication and transactions or communication headed toward the client may be referred to as a downstream transaction or downstream communication.

Further referring to FIG. 4A, steps of a method for implementing an embodiment of clientless cookie management is illustrated. At step one, the client 102 sends a request through the intermediary 200 to server 106. The request comprises a URL request, such as a URL provided by the intermediary 200, for example http://abc.com/dir/index.asp. At step two, the intermediary 200 communicates with the cookie manager 420 which checks the incoming request URL against an internal map of cookies available for the domain name and the path provided by the URL. If the cookie manager detects any matches between the incoming request URL and the cookies available in the internal map, an array of name value pairs is returned from the cookie manager to the intermediary. At step three, the intermediary forwards the modified request to the server 106. In some embodiments, the request may also be referred to as HTTP request, and the modified request may be referred to modified HTTP request. The request may be modified to include one or more cookies from the cookie manager 420. Illustrated in FIG. 4A, the message sent in step three comprises a value of 25 assigned to the cookie. At step four, the server responds to the request with a response including a header and body, such as an HTTP header and a content body. The response may include several cookie definitions by Set-Cookie HTTP header. Further to the example, the response from the server comprises Set-Cookie value set to 25. The intermediary may call upon the cookie manager 420 at step five, while passing to the cookie manager the cookie values from the response. The cookie manager 420 checks if the values received are new or updated for the given URL and performs any necessary updates on the incoming map. Cookie manager 420 also checks if client consumed cookies should be returned to intermediary for web browser consumption. At step six, the intermediary sends to the web browser of the client 102 the response from the server with server consumed cookies removed from the header and client consumed cookies added to the header.

In further details, FIG. 4A depicts a client 102 initiating communication with a first request destined for the server 106 by sending the first request to the intermediary 200. Arrow 1 in FIG. 4A signifies the transmission of the first request http://abc.com/dir/index.asp to the intermediary 200. In some embodiments, the first request is transmitted by a server 106, an intermediary 200 or any other device on the network 104. The first request may or may not include a cookie. In some embodiments, the first request includes a URL or an HTTP request. In further embodiments, the first request includes a path to a resource stored on a server 106. In still further embodiments, the first request includes a unique identifier uniquely identifying client 102 out of all devices communicating on the network. In yet further embodiments, the first request includes a unique identifier uniquely identifying a session on the client 102. In still further embodiments, the first request includes a unique identifier uniquely identifying a user on the client 102. In some embodiments, the client 102 transmitting the first request is not cookie configured and does not transmit cookies. In other embodiments, the client transmitting the first request is using a network or a connection which is not secured or not desirable for transmitting sensitive information.

As illustrated by arrow 2 of the FIG. 4A, intermediary 200 receives the first request and forwards it to the cookie manager 420. In some embodiments, intermediary 200 initiates or invokes the cookie manager 420 in response to received first request. In other embodiments, intermediary 200 initiates or invokes the cookie manager in response to the recognition that the client 102 satisfies a set of preconditions for invoking the cookie manager 420. The set of preconditions may include any determination relating the client 102, the session on the client 102 or the user on the client 102. Determinations may be made by the intermediary 200, client 102, server 106 or any other component or device on the network 104. In some embodiments, determinations are made by policy engine 236. In some embodiments, the set of preconditions includes a determination that the request is from the client 102 that does not support cookies. In further embodiments, the set of preconditions includes a determination that the client 102 uses a session or a connection that is not secured. In yet further embodiments, the set of preconditions includes a determination that the client uses a network that is not a secured network. In still further embodiments, the set of preconditions includes a determination that the client 102 may access the requested resource or service on the server 106 requested by the first request.

The intermediary 200 may activate or initiate the cookie manager 420 in order to check or match the received request URL against an internal map of cookies. The internal map of cookies may also be referred to as a map, a list or a semi-colon delimited list of cookies. In some embodiments, a policy of the policy engine 236 matches a portion of the first request against an internal map of cookies. The map may comprise any number of cookies, each of which may be associated, linked or paired up with any number of clients 102, servers 106 or appliances 200. In some embodiments, cookie manager 420 checks or matches the received request URL to a domain or a path of a message stored in the map. In some embodiments, a policy of the policy engine 236 matches an information relating to the client 102 with a domain or a path of the message stored in the map. The domain or the path of the message may match a URL or a portion any portion of the first request with one or more cookies used for the client 102. In some embodiments, cookie manager 420 or a policy detects or determines a match between a portion of the first request and one or more of cookies or a unique identifiers associated with a client 102 or server 106. In some embodiments, cookie manager 420 or a policy of the policy engine 236 detects or determines a match between a portion of the first request and one or more of name value pairs, or value name pairs.

Cookie manager 420 may generate, provide or return one or more name value pairs in response to the match made between a portion of the received request and a cookie or one or more cookies from the internal map of cookies. The match made between a portion of the received request and a cookie or one or more cookies from the internal map of cookies may be made by a policy of the policy engine 236. In some instances, cookie manager 420 returns one or more name value pairs in response to a determination that either a request from a client 102 or a response to the request from the server 106 matches any one of cookies or unique identifiers from the map. In some embodiments, cookie manager 420 may match a portion of a cookie to a portion of a URL from the received request or the response to the received request. Cookie manager 420 may assign the matched cookie to the first request. In some embodiments, cookie manager 420 may modify the first request to include the matched cookie. In some embodiments, cookie manager 420 generates a cookie for the client 102 or the server 106 if a match is not made. In some embodiments, cookie manager generates a cookie for the client 102 of the first request and assigns the cookie to the client 102. The generated cookie may include a value of the cookie. The value of the cookie may be a unique value uniquely associating the cookie with the client 102 in the internal map of cookies. Cookie manager may use the value of the cookie to associate an incoming response to the first request from the server 106 to the client 102. Cookie manager may assign the cookie to the client 102 to be used for the first request and any other future requests of the client 102 to the server 106. Cookie manager 420 or any other portion of the intermediary 200 may rewrite, modify, format, or change the received requests such as the first request to include the matched or generated cookies or satisfy any format or content requirements of the requests received by the server 106.

Still referring to FIG. 4A, arrow 3 represents the step of the appliance 200 transmitting the first request processed by the cookie manager 420 to the server 106. The first request transmitted may be modified. In some embodiments, the request is modified by the cookie manager 420 or the appliance 200. The request transmitted by the intermediary 200 may include one or more cookies from cookie manager 420. In some embodiments, the modified requests include the value of the cookie which cookie manager 420 may use to associate the request to the client 102. The request which has been modified or changed by the appliance 200 or the cookie manager 420 may be referred to as the modified request. The server 106 may receive the modified request in a format which is consistent with the preferences or configurations for the requests to be processed by the server 106. The server 106 may receive the modified request and determine that the received modified request is a valid request.

Arrow 4 illustrates the step of the server 106 transmitting or issuing a response to the modified request. The issued response may include any information, service or resource the client 102 has requested. In some embodiments, the issued response includes a webpage. In other embodiments, the issued response includes a file. In further embodiments, the issued response includes an application or a computer software program. In still further embodiments, the issued response includes an authentication or authorization message or a message for establishing a session with the client 102. The response from the server 106 may include the value of the cookie which may be used to uniquely identify the client 102 for whom the response is destined. The response from the server may comprise a header and content body, either of which may include any of: one or more cookies, one or more cookie definitions, components or parts of one or more cookies, and values or information relating to or associated with the cookies. In some embodiments, the cookie definitions are set by "Set-Cookie" or "Set-Cookie2" HTTP header. "Set-Cookie" or "Set-Cookie2" HTTP header may herein be referred to as Set-Cookie.

Arrow 5 illustrates the step of the intermediary 200 communicating with cookie manager 420 and modifying the response to the first request. In many embodiments, the intermediary 200 transmits to the cookie manager 420 one or more cookie values or unique client identifiers from the response from the server 106. In many embodiments, the intermediary 200 transmits to the cookie manager 420 one or more cookies from the response from the server. The intermediary 200 may activate or initiate the cookie manager 420 in order to check or match the URL from the response against the map or the list of cookies. Intermediary 200 may modify or edit the response of the server to include a cookie that is matched with a portion of the response. In some embodiments the cookie manager 420 may check or match the URL, the header or any other portion of the response to a domain, a path of a message, a cookie or a part of a cookie stored in the map. In such instances, if any cookies or unique identifiers from a portion of the response are matched with a stored information associated with the client 102, intermediary 200 may modify or edit the response to include the into the response the cookie of the client 102 or any other information associated with the client 102, as desired. In cases when the cookie manager 420 detects a match between the URL from the request or the response, one or more of cookies from the internal map or list of cookies, one or more of name value pairs, or value name pairs, may be returned to the intermediary 200. In some embodiments, a policy of the policy engine 236 matches a portion of the response with one or more cookies or unique identifiers. Sometimes, the cookie manager 420 returns an array of name value pairs in response to the match made between a portion of the response and a cookie or a unique identifier. In some embodiments, the cookie manager 420 may match a portion of a cookie to a portion of a URL from the received request. In a number of embodiments, the cookie manager 420 matches a portion of a cookie to any portion of the received request, such as a URL, a body, or a header of the request. In some embodiments, if the cookie manager 420 does not match a portion of the received response to the request to any cookie, or any unique identifier, the cookie manager 420 generates a new cookie or a new unique identifier or both and assigns it/them to a client 102 or a server 106. The cookie manager 420 may modify the response of the server 106 to the first request using the new generated cookie. Such new cookies and unique identifiers for clients or servers may be used for any future requests or responses of the same clients or servers 106. In some embodiments, cookie manager 420 determines that there are new or updated cookie values for the requests of the client 102 or responses of the server 106 and further updates the map or database accordingly. In addition, cookie manager 420 may also determine if the cookies consumed by the client 102 should be returned to the intermediary 200 for web browser consumption.

Still referring to FIG. 4A, arrow 6 illustrates a step of the intermediary 200 sending or forwarding the modified response to the client 102 via a downstream response. In some instances, the downstream response may be referred to as the transmission from the server 106, via the intermediary 200, towards the client 102. Similarly, the upstream communication may be any communication from the client 102, via the intermediary 200, and towards the server 106. In some embodiments, the modified response does not include any cookies. In further embodiments, the modified response includes the unique client identifier which is used by the cookie manager 420 to associate one or more client 102 associated cookies to the client 102. In still further embodiments, the modified response includes any format desired or accepted by the client 102. The modified response from the intermediary 200 to the client 102 may comprise server consumed cookies removed from response. In some embodiments, the modified response forwarded may comprise client consumed cookies re-added to the header or any other part of the response. In many embodiments, the modified response from the intermediary 200 to the client 102 includes the response from the server 106 modified to exclude the cookie associated with the client 102 in the cookie manager 420.

Cookie management, such as the cookie management by cookie manager 420 may cause or provide services, resources or applications used by the client 102 and provided by the server 106 to run or be provided within the same cookie domain namespace. The intermediary 200 may provide client side cookie management or server side cookie management to increase the security of the cookies transmitted between the client 102 and the server 106. Cookie management, such as client side cookie management, may eliminate the restrictions of the HTTP protocol limitations such as the maximum amount of cookies allowed from a single source per a single client. For example, in a system which may only allow 20 cookies per session with a client, cookie management by the cookie manager 420 of the intermediary 200 may enable the client to eliminate such limitation by reusing the cookies associated with the client and stored in the cookie manager 420. Using client side cookie management, in such examples, may enable the client 102 to continue communicating with the server 106 even in situations when the 20 cookies per session limitation would affect the service provided to the client. In this case, the intermediary 200 intercepting and forwarding the communication between the client and the server may manage, modify, rewrite or edit portions of the requests or responses and use the cookies associated with the client or the server, thus enabling the communication even after more than 20 cookies are transmitted.

Clientless cookie management performed by the cookie manager 420 or the intermediary 200 may involve rewriting cookie paths on the downstream cookie headers which are headed toward the client 102 or to the server 106. In some embodiments, the cookie manager 420 or the intermediary 200 forwards the responses or the requests from the client 102 or the server 106 to the intended destinations without changing or modifying them. In other embodiments, clientless cookie management performed by the cookie manager 420 may involve state management by the intermediary 200. The cookie manager 420 may be invoked by the intermediary for checking upstream requests for server cookies that should be injected into the stream or communication directed to the server 106. The responses from the downstream communication that are intended to be modified such that they are stripped of the cookies may persist in the cookie manager.

Referring now to FIG. 4B, a sequence diagram of an embodiment of steps of a method for clientless cookie management is depicted. In brief overview, FIG. 4B illustrates a browser of the client 102 communicating with a web application of the server 106 via an appliance 200 and cookie manager 420. Client 102 sends an HTTP request to the appliance 200, which herein may also be referred to as an intermediary 200. Intermediary 200 processes the request and uses cookie manager 420 to check for cookies. Cookie manager 420 returns the cookies associated with the request to the intermediary 200. The intermediary 200 modifies the header of the HTTP request to include the cookies and transmits the modified HTTP request to the server 106. The server 106 returns the HTTP response to the HTTP request. Intermediary 200 sends any cookies from the HTTP response to the cookie manager 420 to be added to the map used to associate all the cookies of the client 102 with the client 102. The intermediary 200 modifies the response to remove the cookies from the HTTP response and uses cookie manager 420 to further add any client 102 related cookies to the HTTP response. The intermediary 200 transmits the modified HTTP response to the client 102.

In further overview, FIG. 4B illustrates client 102 sending a request to the intermediary 200, herein also referred to as the proxy. The request may be any request to access any resource or any service provided by the server 106. In some embodiments, the request is a HTTP request to access a webpage or a website related service. In other embodiments, the request is a request to establish a connection with the server 106. In further embodiments, the request is a request to establish a session with the server 106. In still further embodiments, the request is a request use an application provided by the server 106. In yet further embodiments, the request is a request to access a streaming file, such as an audio or a video file. In yet further embodiments, the access is an access to a secure documentation. The request may include multiple requests.

Intermediary 200 may process the received request and use cookie manager 420 to check for cookies. The intermediary may process the request and establishing which, if any, cookies client 102 includes. Processing of the request may further include establishing a unique client identifier to identify any further communication with the client 102. The intermediary 200 may processes the request and forward it to the cookie manager 420. In some embodiments, the intermediary 200 forwards a portion of the request to the cookie manager 420. In some embodiments, cookie manager 420 uses one or more maps to relate or associate client 102 related information such as the unique identifiers of the client with cookies used for communication by the clients 102 to the server 106. Similarly, the maps of the cookie manager 420 may be used to associate any client 102 side cookies with the server 106 side cookies that the client 102 uses for the communication with the server 106. In some embodiments, a unique identifier from a request is matched to a name value pair or a cookie in the map. The cookies may be associated with the client 102 via the map of the cookie manager 420. Cookie manager 420 may create new cookies for the client 102 if such cookies already do not exist in the map of the cookie manager 420.

In some embodiments, as each request or a response is processed by the intermediary 200, the intermediary 200 checks if the URL of the transmission being processed is server side cookie management enabled. Intermediary 200 may call the cookie manager related function such as ProcessRequest( ) to do request processing. Cookie manager 420 may further check an internal map, which may be a cookie manager map or a cookie manager list, used to help determine if there are any incoming cookies that need to be added to the upstream request. Cookie manager 420 may also record all cookies encountered for the first time in the session inside the map for future requests. Cookie manager may also ensure that the system is not sending certain cookies, such as appliance 200 related cookies for example, to hosted web applications, such as for example, the NSC_AAAC. In some embodiments, a function, such as ProcessRequest( ) function for example, may call another function, such as FilterCookies( ) for example, internally. In some embodiments, FilterCookies( ) may call ProcessRequest( ). In some embodiments, the two sets of values may be referred to as a Citrix.Fei.ClientCookies and a Citrix.Fei.ServerCookies. Cookie manager 420 may use Citrix.Fei.ClientCookies and a Citrix.Fei.ServerCookies to create a semi-colon delimited list or an internal cookie manager map, herein also referred to as a cookie manager list or the map. The map may be used during decision making process of cookie management. The cookie manager 420 may serialize the cookie manager map entries in the cookie manager 420 into the two session values, Citrix.Fei.ClientCookies and Citrix.Fei.ServerCookies. The cookie manager 420 may also use these two values to persist to the session or associate to the session the client 102 or the server 106 for any future transmissions. If the cookie manager 420 matches the request of the client 102 to a cookie or a plurality of cookies in the map, the cookie manager 420 may transmit the cookie or the plurality of cookies to the appliance 200.

The intermediary 200 may modify the header of the HTTP request and transmit the modified HTTP request to the server 106. In some embodiments, the cookie manager 420 modifies the request to include the cookie or the plurality of cookies that are associated with the client 102. In some embodiments, the cookie manager 420 modifies a portion of the request, such as a URL or a heading to include a value or a set of values or characters identifying a cookie. In some embodiments, cookie manager 420 modifies the request to include or add a portion of a cookie which is associated with the client 102. In other embodiments, cookie manager 420 modifies the request to include or add an unique identifier associated with the client 102. In further embodiments, cookie manager 420 modifies the request to exclude or remove a cookie or a unique identifier from the request of the client. In some embodiments, any component of the intermediary 200 modifies the request to include the cookie or the cookies provided by the cookie manager 420.

The intermediary 200 may perform any number of modifications to the request. In some embodiments, intermediary

200 overwrites a portion of the request with one or more portions of one or more cookies. In other embodiments, intermediary 200 adds a portion of one or more cookies, or a plurality of portions of one or more cookies to the request. In still further embodiments, intermediary 200 modifies the cookie within the request. The intermediary 200 may change one or more values or characters within the cookie or otherwise modify the cookie to be acceptable by the server 106. In yet further embodiments, intermediary 200 encrypts a portion of the request. In still further embodiments, intermediary 200 modifies the request to accommodate any configuration related preferences or requirements of the server 106. The modified request may be changed such that it can be processed by the server 106. The intermediary 200 may transmit the modified request to the server 106.

The server 106 may process the modified request and in response transmits to the intermediary 200 a response to the request. In some embodiments, the response to the request includes an HTTP transmission. In further embodiments, the response includes a webpage. In yet further embodiments, the response includes a file the client 102 requested. In still further embodiments, the response includes an authentication message to authenticate the client 102 on the server 106. In yet further embodiments, the response includes a transmission for starting or opening a session or a connection between the client 102 and server 106. In still further embodiments, the response includes an executable file, a program, a function, data, a streaming file or any other resource or service provided by the server 106. In some embodiments, the server 106 transmits to the intermediary 200 a plurality of responses to the request.

Intermediary 200 may send any cookies from the HTTP response to the cookie manager 420 to be added to the map of the cookie manager 420. Any new cookies added to the map of the cookie manager may be used for future transmissions between the client 102 and server 106. In some embodiments, the intermediary modifies the reply to exclude cookies from the reply. In other embodiments, the intermediary takes out the cookies from the reply and transmits the cookies to the cookie manager 420. The cookie manager 420 may compare the received cookies to the cookies already stored in the map. In some embodiments, cookie manager 420 stores the received cookies in response to the determination that the received cookies were not previously stored in the map in relation to the client 102 or the server 106. The cookies stored may be utilized later for the communication for the same client 102. In some embodiments, the transmission to the cookie manager 420 comprises any number of cookies or a portion, a cookie or a unique client identifier relating the client 102, the server 106 or both the client 102 and the server 106.

The intermediary 200 modifies the response to remove the cookies from the HTTP response. The intermediary may further use the cookie manager 420 to add any client 102 related cookies to the HTTP response, if such cookies exist or are necessary. In some embodiments, the intermediary modifies, edits or changes the response to exclude any server 106 cookies. In further embodiments, the intermediary 200 modifies the response to replace the server 106 cookies with client 102 cookies. In yet further embodiments, the intermediary 200 modifies the response to satisfy the format, configurations or preferences of the client 102, so that the modified response may be acceptable or usable to the client 102. As each response or request is processed, the intermediary 200 may determine if a server side cookie management or a client side cookie management is enabled. In some embodiments, as server side cookie management is enabled the intermediary 200 may call upon a function, such as a cookie manager 420 function ProcessResponse( ). In a number of embodiments, as client side cookie management is enabled the intermediary 200 may call upon cookie manager 420 function ProcessResponse( ) or another function which performs cookie or unique identifier management or internal cookie map management. The cookie manager 420 may check the cookies from a received response or request for the server or client consumed cookies. In some embodiments, the cookie manager matches the cookies received from the request or the response to cookies stored or listed in the map. The cookie manager 420 may also add a name value pair, registering or assigning a new cookie or a new client identifier in the map if such cookie or client identifier was not registered, listed or assigned in the map earlier. Cookie manager 420 may thus populate the map with new client identifier or new cookies which may be used in the future communication with the clients and servers associated with such cookies or unique identifiers. In a number of embodiments, cookies or Set-Cookie header may be removed from the response when handed back to the intermediary 200. By preventing the server consumed cookies from being sent to the client, the system may extend a number of cookies for a given domain to a number beyond a predetermined limit. In systems which limit the number of cookies to a maximum of 20, this feature may be useful to enable the client 102 to keep using the service on the server 106 without reaching the limitation of 20 cookies maximum. Such practice may also prevent important cookie data from being accessed or read in the network space beyond a firewall of the company sending out the sensitive information.

The intermediary 200 transmits the modified HTTP response to the client 102. In some embodiments, the modified response includes a client 102 cookie. In other embodiments, the modified response includes the original request as sent by the server 106 to the intermediary 200. In still further embodiments, the modified response includes a portion of the response that is reformatted to be in accordance with configuration or standards of the client 102 or the client 102 application or function used for processing of the modified response. The intermediary 200 may in response to the received modified response transmit to the intermediary 200 another request destined for the server 106.

The intermediary 200 may apply any of the access profiles, policies, rules and actions to any level of granularity of portions or subsets of network traffic traversing the intermediary 200. The level of granularity may range from fine to coarse based on the configuration. The logic, criteria or conditions of rules of access profiles, rules and policies described herein may be defined or specified to apply to any desired subset or portion of network traffic or transmissions transmitted via the appliance 200. In one aspect, the level of granularity refers to a degree, measurement, fineness or coarseness of portions of network traffic to which the configuration may apply. In very broad or coarse granularity of configuration, an access profile, rule or a policy may apply to all network traffic. In a very fine granularity configuration, an access profile or policy may apply to a specific subset of network traffic of a particular user, such a traffic or portions of traffic of a particular application of a particular user. In some granularity configurations, an access profile, policy or a rule applies to any client 102 sending a request to a server. The policy, rule or access profile may be defined to address, or apply to any client 102, and may be based on any configuration of the client 102 or information relating the client 102, such as for example a portion the client 102 request. Similarly, the policy, rule or access profile may be defined to address, or apply to any server 106, and may be based on any configuration of the client 106 or information relating the server 106, such as for example a portion the server 106 response. In some granularity configurations, an access profile, policy or a rule is defined to apply to a specific session or connection the client 102 is using to connect to the server 106, via the appliance 200.

In further embodiments, an access profile, policy or a rule is defined to apply to any client 102 the is connected via SSL VPN session or connection. In further embodiments, an access profile, policy or a rule is defined to apply to any client 102 that is connected via clientless SSL VPN session or connection. In still further embodiments, an access profile, policy or a rule is defined to apply to any client 102 that is connected to via client based SSL VPN session or connection. In still further embodiments, an access profile, policy or a rule is defined to apply to any client 102 or client session that sends a request to a particular server 106. In yet further embodiments, an access profile, policy or a rule is defined to apply to any client 102 or client session that requests a particular application or a resource on the server. In further embodiments, an access profile, policy or a rule is defined to apply to any client 102 or client session based on the cookie configuration, for example if the cookies are enabled or disabled. In still further embodiments, an access profile, policy or a rule is defined to apply to any client 102 or client session that sends a request that includes a particular URL, or a portion of a particular URL. In yet further embodiments, an access profile, policy or a rule is defined to apply to any client 102 or client session based on a match between a portion of the request sent by the client 102 and a phrase or a key of the access profile, policy or the rule. In some embodiments, an access profile, policy or a rule is defined to apply to any server 106 or a server session based on an information relating a client 102 accessing the server 106. Such information may include a portion or feature of the request of the client 102, a setting or configuration of the client 102, or any other client 102 related information. In some embodiments, an access profile, policy or a rule is defined to apply to any server 106 or server session based on the configuration of the server 106 or the features of the content that the server 106 is transmitting to the client 102.

Referring now to FIG. 4C, an embodiment of a cookie proxy data flow control is illustrated. In brief overview, FIG. 4C depicts a client 102 communicating with a server 106 via an intermediary 200 that manages the flow of the cookies between the client 102 and a server 106. Client 102 sends a request to a server 106 via an appliance, also referred to as an intermediary 200. The request comprises a URL such as "GET/index.html HTTP/1.1". Intermediary 200 intercepts the request sent by the client 102 and forwards the request to the server 106. The server 106 in response to the request, issues a response that comprises a cookie, such as for example, "HTTP/1.1 200 OK\nSet-Cookie: name=value". Intermediary 200 strips and stores the cookie and replaces the cookie with a client ID that uniquely identifies the client 102. The unique client ID may be a consolidated cookie and may be associated with the cookie in the intermediary 200 for future transmissions. Intermediary 200 forwards the modified response that includes the unique client ID to the client 102. The modified server's response may comprise information such as for example, "HTTP/1.1 200 OK\nSet-cookie: NSC_AAAC=Unique client ID". The client 102 transmits a second request using the unique client ID, such as "GET/foo.html HTTP/1.1\nCookie:NSC_AAAC=Unique client ID". Intermediary 200 receives the second request and using the unique client ID retrieves the cookie that was stored based on the unique client ID. Intermediary 200 modifies the request and inserts the previously stored cookie into the request. The modified second request may be formatted to include the same or a similar cookie that was used in the prior transmission, such as for example, "GET/foo.html HTTP/1.1\nSet-Cookie: name=value". Intermediary 200 transmits the modified second request to the server 106.

Further referring to FIG. 4C, the client 102 may initiate the communication with the server 106 by sending a request to the intermediary 200. In some embodiments, the request may be an HTTP request, such as for example, "GET/index.html HTTP/1.1". In some embodiments, client 102 attempts to communicate with the server 106 for the first time. In further embodiments, the client 102 transmits any HTTP request destined for the server 106 to the intermediary 200. The client 102 may transmit any request to the intermediary 200 to access a resource or a service on the server 106.

The intermediary 200 may forward the request to the server 106. In some embodiments, intermediary 200 modifies the request and forwards the modified request to the server 106. In other embodiments, the intermediary 200 does not modify the request. In further embodiments, intermediary 200 forwards the request to the server 106 without modifying any portion of the request. In some embodiments, intermediary forwards the HTTP request, such as for example, "GET/index.html HTTP/1.1", to the intermediary 200.

The server 106 may issue a response to the request that may include a cookie. In some embodiments, the response may be, for example, "HTTP/1.1 200 OK\nSet-Cookie: name=value". The cookie may be in a header of a response or within any other portion of the response. In some embodiments, the cookie may be included in the URL of the response. The cookie may be any type and form of cookie and may be included anywhere within the response.

Intermediary 200 may strip and store the cookie from the response and replaces the cookie with a client ID that uniquely identifies the client 102. Once the response of the server 106 is received by the intermediary 200, the intermediary may create a cookie-jar for the given domain for the client. The cookie jar may include or store any collection of cookies for a given domain and client, such as client 102. In some embodiments, the cookie jar may be a file, a list, a database, an array, a data structure or a folder comprising any number of cookies or any number of information comprised by the cookies. In some embodiments, the intermediary 200 may strip "Set-Cookie" header from the response header issued by the server 106 and it may store the Set-Cookie header into the cookie-jar. The intermediary 200 may also generate a unique cookie-proxy session cookie. The cookie proxy session cookie may comprise any relevant information the client 102 may receive from the cookie sent by the server 106 without actually receiving the cookie. The cookie proxy session cookie may thus convey all the relevant information from the cookie sent by the server 106 to the client 102 in a manner acceptable by the client 102 or by the client 102's web browser. The intermediary 200 may insert a cookie-proxy session cookie into the cookie-jar or relate a cookie proxy session cookie with the related and corresponding cookie sent by the server 106. In a number of embodiments, the intermediary 200 may insert the cookie proxy response cookie into a response header of the message to be sent from the intermediary 200 to the client 102. In some embodiments, the intermediary 200 may leave the domain and path unchanged, while in other embodiments, the intermediary may change either the domain or the path, or both the domain and the path. In some embodiments, the intermediary 200 inserts a unique client ID into any part of the communication sent from the intermediary to the client 102.

Intermediary 200 may forward the modified response to the client 102. The modified response may include a unique client identifier, such as a unique client ID. In some embodiments, the modified response includes a client 102 cookie. In further embodiments, the modified response is modified to be in accordance with the configuration of the client 102. In some embodiments, the modified response includes the original response of the server 106 without any modifications. The modified server's response may comprise information in any HTTP form, such as for example, "HTTP/1.1 200 OK\nSet-Cookie:NSC_AAAC=Unique client ID".

The client 102 transmits a second request using the unique client ID. The second request may be same, similar or substantially similar to the first request. In some embodiments, the second request includes the same form as the first request. In further embodiments, the second request is by the same application used for transmitting the first request. In some embodiments, the second request is an HTTP request, such as "GET/foo.html HTTP/1.1\nCookie:NSC_AAAC=Unique client ID". The second request may include the unique client ID or a portion of the unique client ID issued by the intermediary 200.

Intermediary 200 may modify the second request to include the cookie associated with the server 106. Intermediary 200 may retrieve the server 106 cookie using the unique client ID that was stored in association with the cookie of the server 106. Intermediary 200 may modify second request and inserts the previously stored cookie into the second request. Intermediary 200 may modify the request and insert the previously stored cookie into the request. In some embodiments, intermediary 200 modifies the request to include the previously stored cookie into the second request. The intermediary 200 may check if the cookie proxy session cookie is present. In case that the cookie proxy session cookie is present, the intermediary 200 searches the cookie jar based on the cookie proxy session cookie. Intermediary 200 may use the cookie which is retrieved using the cookie proxy session cookie to find the intended domain and path. Intermediary 200 may also insert cookie or cookies in the request code path and/or strip the cookie-proxy-session-cookie.

In some embodiments, the proxy 200 may keep a reference pointer from server-side PCB to the cookie jar in order to mark the response path. In further embodiments, the proxy 200 keeps a reference pointer from session information in the cookie in order to mark the response path. In some embodiments, if the cookie jar has already been created for a specific session involving a specific client 102 and a server 106, the intermediary 200 may not create a cookie jar during the second set of communications within the same session. Instead, the intermediary 200 may use the same cookie jar as used previously for the same session. In some embodiments, the intermediary 200 may already have a reference to a cookie jar created for a client 102 and a server 106. In a number of embodiments, the reference to a cookie jar may be implemented through a protocol control block or PCB, a controller, as well as any piece of software, a database, an array or a structure comprising any set of values. In certain embodiments, if the client disables cookies, then no subsequent requests from the client may comprise any cookie proxy session cookie. In some embodiments, if the client disables cookies, subsequent requests from the client may comprise a cookie proxy session cookie. In some embodiments, subsequent responses from a server 106 to a client 102 may create a cookie jar with no further reference to the client 102 or the server 106 the cookie jar is used for. In further embodiments, subsequent response from a server 106 to a client 102 may create a cookie jar with reference to the client 102 or the server 106 the cookie jar is used for.

In a number of embodiments wherein a client 102 is communicating with a server 106 for more than one time in a given session, the intermediary 200 may not send the cookie-proxy session cookie again after the first communication. The intermediary may use a unique client identification method to uniquely identify a client 102 or a server 106. In some embodiments, a unique client identification method, also referred to as unique client ID, may be used to uniquely identify a client 102 communicating to a server 106 or a server 106 communicating to a client 102. In a number of embodiments, a unique client ID may be used to uniquely identify a client 102 communicating or sending a message or a request to a server 106 via an intermediary 200. In a plurality of embodiments, a unique client ID may be used to uniquely identify a server 106 communicating or sending a message or a request to a server 106 via an intermediary 200. In some embodiments, the intermediary 200 uses the unique client ID to detect and determine whether to proxy a communication sent by a client 102.

In a number of embodiments, an intermediary 200 may perform cleaning up of cookies, determining unnecessary cookies or terminating unnecessary cookies. In a number of embodiments, an intermediary 200 may use a reference pointer from a client 102's PCB to a cookie jar created for the client 102. The modified second request may be formatted to include the same or a similar cookie that was used in the prior transmission. In some embodiments, the modified second request is an HTTP request, such as a modified second HTTP request such as for example, "GET/foo.html HTTP/1.1\nSet-Cookie: name=value".

Intermediary 200 may transmit the modified second request to the server 106. In some embodiments, intermediary 200 transmits any number of modified requests to the server 106. The modified requests may be of any type, form and format. Intermediary 200 may thus utilize the cookie jar to transmit back and forth any number of requests from the client 102 and responses from the server 106.

Cookie Proxy may be any module controlling, managing or reforming cookies or transmission of cookies utilizing configuration settings. In some embodiments, cookie proxy may be cookie manager 420. In a number of embodiments, cookie proxy may be a part or a subcomponent of cookie manager 420. In a plurality of embodiments, cookie proxy may comprise a cookie manager 420. In certain embodiments, cookie proxy may be used interchangeably with cookie manager 420 and may comprise any and all functionality and means of performance of a cookie manager 420. In some embodiments, cookie manager 420 may be referred to as cookie proxy. In a number of embodiments, cookie proxy may be independent of intermediary 200 or a cookie manager 420. In certain embodiments, cookie proxy may be a software program or an application capable of working independently from the intermediary 200 or cookie manager 420 or working together with the intermediary 200 or cookie manager 420.

Cookie proxy may comprise configuration settings based on a policy or action of a policy. In a number of embodiments, a user or an administrator may configure the cookie proxy to determine what cookies to store into the cookie jar, and what cookies not store into cookie jar. In a plurality of embodiments, a user or an administrator may decide for any specific domain, such as for example "www.foo.com", if the intermediary 200 should proxy cookie1 and allow cookie2, cookie3 to flow through, as any of the cookie1, cookie2 and cookie3 may or may not be client consumed cookies.

In some embodiments, cookie proxy configuration may utilize a command line interface (CLI) syntax such as for example:

```
add/delete/set/unset/show cookieproxy action <action-name>
<ALL [ -EXCEPT <cookie-name>,[<cookie-name>,...]] |
<cookie-name>,[<cookie-name>,...]>
```

In addition the cookie proxy configuration may also comprise other syntax such as:

```
add/delete/set/unset/show cookieproxy policy <name> <rule> <jar name>
[-CookieProxyAction <action-name>] [<undefAction>]
```

In a number of embodiments, if no action is specified by the user or the administrator, the default behavior by the cookie proxy may be to proxy all the cookies, or proxy none of the cookies, or proxy a fraction of cookies as determined by a set of policies relating the cookie proxy.

A bind operation may bind, group, tie together or associate a configuration, such as a policy, with an entity, such as a user or resource. The act of binding may place the configuration into an active state to be applied to the assigned entity. In some embodiments, a bind operation may associate one entity with another entity or apply the functionality of a module to an entity. A bind operation may be an operation performed by the cookie proxy, or by policy of the cookie proxy. In some embodiments, through configuration commands the cookie proxy may be bound to a virtual server 275. In a number of embodiments, the cookie proxy policy may be bound to a load balancing server, a GSLB server or a VPN server. The policy rule utilized by the cookie proxy or by intermediary 200 may be any policy infrastructure rule language (PIRL) based. In some embodiments, the policies utilized by the cookie proxy or intermediary 200 may be evaluated during the response time, or the time the intermediary or the cookie proxy to respond to a request or both. In a number of embodiments, the policies utilized by the cookie proxy or intermediary 200 may be evaluated or implemented during the response time.

In some embodiments, the cookie proxying method may use the unique client IDs assigned to each client. The unique client-id may be used by the intermediary 200 to map a cookie-jar associated with a specific client 102 to the client 102. In a number of embodiments, a client, also referred to as client 102, may not send any unique client ID along with a transaction, also referred to as communication or a request. In a number of embodiments, a cookie proxy session cookie may be used as a default client-identification mechanism or a unique client ID. In some embodiments, client identification may be based on a client's internet protocol address, fragments of request or HTTP communication, a unique components of a communication sent by the client 102 or the server 106, a unique feature relating a session, an SSL VPN session cookie or an SSL VPN session body. In a number of embodiments, client identification may be configurable. In a plurality of embodiments, client identification may be implemented utilizing client 102's internet protocol address, also referred to as IP address.

Cookie jar cleanup, or cookie jar elimination may be completed pending a determination of a variety of parameters such as the size of a cookie jar or timing relating a cookie jar, such as idle timing of the cookie jar for example. In some embodiments, cookie jar clean up method may utilize a timeout of idle time or a memory-threshold. In a number of embodiments, the cookie jar clean up may be implemented based on configuration associated with a cookie itself or a session timeout which may result in all the cookies belonging to the session being cleaned up following a time-out. In some embodiments, cookie jar clean up method may determine which cookies to clean up based on the amount of time which has passed since a particular cookie or a cookie jar was last used or accessed.

In some embodiments, CLI syntax may be used for jar and client identification, such as for example:

```
add/delete/set/unset/show cookieproxy jar <jar-name>
-clientidentification <default | request based PIXL expression>
-maxMem <Memory limit>
```

In a number of embodiments, default may be to use a session cookie inserted by cookie proxying module into a header or in the URL if cookies are not supported. In a plurality of embodiments, a rule of policy may be used to find any unique header field, e.g. cookie for SSL VPN or a session cookie for LB load balancing.

In a number of embodiments, when a maximum memory limit is reached for any cookie jar, a session which is inactive for the longest duration of time may need to be timed-out and the cookies belonging to that session may need to be cleaned up. In a plurality of embodiments, a timestamp may be associated with each client 102, server 106, a client/domain combination, or each client-server session, or any session in order to achieve a URL based cleanup.

Runtime aggregation of different policies or actions may be utilized by the cookie proxy or the intermediary 200. In a number of embodiments, runtime aggregation of policies or actions may be used by the intermediary 200 or the cookie proxy in order to decrease the configuration overhead or simplify the configuration modification. In a plurality of embodiments, the intermediary 200 or the cookie proxy may be configured to stop at first matched policy. In some embodiments, the administrator or the user has to do the aggregation during configuration time and create appropriate policy and action. In certain embodiments, the runtime behavior of cookie proxy action is ruled in part by searching for a match in the policy or the list of polices and stopping at the policy once the match is encountered. In some embodiments the cookie proxy may stop at a first policy defining or comprising a set of cookies to be proxied or an information relating a set of cookies to be proxied, which may reduce the run-time aggregation.

Cookie jar infrastructure may be used for cookie repository, however in some instances, additional API may used for retrieving cookies based on domain or path. In some embodiments, a hash based search mechanism may be used to retrieve cookie proxy sessions. This method may be similar to an SSL VPN session hashing mechanism utilized in other Intermediary 200 related applications. In a number of embodiments, a key for the hash function may depend on client identification mechanism or client identification protocol. In a plurality of embodiments, a different hash function for a different client identification mechanism may be utilized.

Cookie repository management may depend on performance or resources. In some embodiments, cookie repository is managed by associating a cookie jar per client per domain. In a plurality of embodiments, the set of cookie names comprises cookie names repeatedly stored in every cookie jar. In a number of embodiments, the set of cookie names used is different from a cookie jar to a cookie jar, while in other embodiments the set of cookie names used between a plurality of cookie jars comprises some of the same or similar names. In some embodiments, cookie jars are organized such that a cookie jar may be associated with a specific client and with a specific virtual server handling the transmission. In a number of embodiments, cookie jars are organized such that a cookie jar is associated with a client, a virtual server and a domain.

In some embodiments, a cookie jar may store no cookies which are named same as another cookie within the jar. In certain embodiments, a cookie jar may comprise cookie names having values associated with cookie names in a method similar to the method utilized in headers, such as HTTP headers for example.

Cookie proxy may comprise a number of functionalities. In some embodiments, a cookie proxy may utilize cookie proxying or any number of embodiments discussed herein to determine if a browser may handle or accept cookies or not. In a plurality of embodiments, a cookie proxy may determine if the request sent by a client 102 or a server 106 matches certain criteria in order to determine if a browser from the client or the server accepts or handles cookies. In some embodiments, if the request sent by the client 102 or the server 106 matches the criteria for being able to accept or handle cookies the intermediary 200 may send a redirect message to the client, such as:

```
http://incoming_host/
incoming_url?new_param_added=secure_client_id
along with a secure_client_id set-cookie.
```

In some embodiments, if the client comes back with the request URL such as for example "http://incoming_host/incoming url?new_param_added=secure_client_id", the intermediary may verify if the unique client ID is associated with the cookie value. If the intermediary detects a match, the intermediary may strip off the parameter it had added and may process the original request. In addition, the intermediary may also mark the cookie-proxy session to use "cookie-proxy session cookie". In case where the unique client ID is not matched with the cookie value, the intermediary may utilize a different method such as body-rewriting for session tracking. In such a method the response body may be rewritten to include the session info into each HTTP link.

In some embodiments, the cookie proxy or the intermediary 200 may also comprise cookie proxy cookie jars, also referred to as cookie proxy session cookie jars. Cookie proxy cookie jars may comprise any number of cookie proxy cookies, also referred to as cookie proxy session cookies. In a number of embodiments, cookie proxy cookie jar may be organized or implemented in a similar manner to the cookie jar, and may comprise all functionality of a cookie jar.

In certain embodiments, cookie-proxy cookie jars may be capable of working together with highly available applications and technologies, also referred to as HA technologies. In some embodiments, an intermediary comprising a set of cookies and unique client IDs may communicate the cookies and client IDs to other appliances on the network. In a plurality of embodiments, a first intermediary 200 comprising a cookie and a unique client ID associated with a client 102 or a server 106 may share the information relating the cookie or the unique client ID with a second intermediary 200 or a plurality of appliances 200. In cases where the first intermediary shares the information relating a cookie or a unique client ID with the second appliance, the second intermediary may also be able to implement communication between the client and the server using the cookie and the unique client ID.

Cookie proxy, cookie manager 420 or the intermediary 200 may comprise any number of software applications or functions implemented in script or software in order to establish and manage cookies. In some embodiments the cookie proxy, cookie manager 420 or the intermediary 200 may comprise a software code for managing a cookie jar such as for example:

```
/* AppSecure Cookie-jar API. */
/* Create an empty cookie jar */
as_cookie_jar_t *as_cookie_jar_create(as_allocator_t *allocator);
/* Get value of a cookie, given name */
as_cookie_t *as_cookie_jar_get(as_cookie_jar_t *cookie_jar, astr_t *name);
/* Add a cookie to the jar. If nodup is set, and a previous cookie exists with the same
name,path,domain, then delete it before adding the new one */
ns_status_t as_cookie_jar_add(as_cookie_jar_t *cookie_jar, as_cookie_t *cookie, int
nodup);
/* Delete cookies with same name, value, path and domain as cookie */
ns_status_t as_cookie_jar_delete(as_cookie_jar_t *cookie_jar, as_cookie_t
*cookie);
/* Delete all name-value pairs given name */
ns_status_t as_cookie_jar_delete_by_name(as_cookie_jar_t *cookie_jar, astr_t
*name);
/* Destroy cookie-jar */
void as_cookie_jar_destroy(as_cookie_jar_t *cookie_jar);
/* Parse an http Cookie header cookie string into multiple cookies and add
 * them to the cookie jar */
ns_status_t as_cookie_jar_parse_cookie(as_cookie_jar_t *cookie_jar, const astr_t
*cookie_string);
/* Parse an http Set-Cookie header string into multiple cookies and add them to the
cookie jar */
ns_status_t as_cookie_jar_parse_set_cookie(as_cookie_jar_t *cookie_jar, const
astr_t *cookie_string);
/* Stringify cookie jar to use as cookie value in an http request */
astr_t *as_cookie_jar_to_cookie_string(as_allocator_t *allocator, as_component_t
owner, as_cookie_jar_t *cookie_jar);
/* Stringify cookie jar to use as the set-cookie value in the http response */
astr_t *as_cookie_jar_to_set_cookie_string(as_allocator_t *allocator,
as_component_t owner, as_cookie_jar_t *cookie_jar);
/* Create an iterator */
as_cookie_jar_iterator_t * as_cookie_jar_iterator_create(as_allocator_t *allocator
as_component_t owner_id, as_cookie_jar_t *cookie_jar);
```

```
int as_cookie_jar_iterator_init(as_allocator_t *allocator, as_component_t owner_id,
as_cookie_jar_t *cookie_jar as_cookie_jar_iterator_t *iter); int
as_cookie_jar_iterate(as_cookie_jar_iterator_t *iter, as_cookie_t **cookie);
void as_cookie_jar_iterator_destroy(as_allocator_t *allocator,
as_cookie_jar_iterator_t *iter);
int as_cookie_jar_size(as_cookie_jar_t* cookie_jar);
as_cookie_jar_iterator_create(as_allocator_t *allocator, as_component_t
owner_id, as_cookie_jar_t *cookie_jar);.
```

The cookie manager or proxy may determine when, how and what cookies to manager and/or store to cookie jars, and any of the operations described above, responsive to one or more policies of the policy engine, include any rules, conditions or actions of such policies. Any of the policies and the corresponding cookie operations may be based on a session. In a number of embodiments, policy engine 236 provides policies or rules through which an action regarding the cookie management is determined. In some embodiments, policy engine 236 may comprise a list of policies or rules providing a means for the intermediary 200 or the cookie manager 420 to determine an action concerning a cookie or a unique client ID to be implemented. As such, through configuration and policy, the intermediary may provide fine granular control for cookie management, including for clientless SSL VPN access.

In one example, a server may be providing access to a number of clients accessing different applications via the appliance 200. Two of such applications may be application1 and application2. Both applications may use ASP.NETSESSIONID which may be a server consumed cookie that is not used and not written to on the client side. In addition to ASP.NETSESSIONID, application1 may further use a cookie AppClientInfo which may be read and written to by a first client accessing or using the application 1, but not by a second client accessing the same application.

In such embodiment, the configuration of the appliance 200 to handle such, or a similar situation, may be:

```
add patclass app1_clientconsumed_cookies
bind patclass app1_clientconsumed_cookies AppClientInfo
set vpn clientlessAccessProfile app1_profile -ClientConsumedCookies
app1_clientconsumed_cookies
add vpn clientlessAccessPolicy app1_access_pol
"http.req.url.path.get(1).eq(\"app1\")" app1_profile
```

The URLs that are generated while accessing the web application1 and application2 are identified with term: /app1. The policy expressed in the example above may evaluate to true the instances or situations when there is a HTTP request received whose URL path starts with "/app1/". One example of such a HTTP request is "GET/app1/display.asp". Thus, all the cookies for such a request (for application1, or app1) except the cookie named AppClientInfo will be proxied.

In further example, an application 2 uses App2ClientCookie1 and App2ClientCookie2 which may be used on the client side or by the client, but rest of other cookies used by it are not required to be present. Such a configuration might be:

```
add patclass app2_clientconsumed_cookies
bind patclass app2_clientconsumed_cookies App2ClientCookie1
bind patclass app2_clientconsumed_cookies App2ClientCookie2
set vpn clientlessAccessProfile app2_profile -ClientConsumedCookies
app2_clientconsumed_cookies
```

```
add vpn clientlessAccessPolicy app2_access_pol
"http.req.hostname.set_text_mode(ignorecase).eq(\"app2\")"
app2_profile
```

In this configuration, application2 (referred as the App2) may be hosted on the web server whose hostname is app2 and thus all the cookies except App2ClientCookie1 and App2ClientCookie2 will be proxied for application2 (App2). In these and similar examples, the administrator may configure the same cookie having name AppClientInfo to be proxied for application2 but not for application1. Similarly, the administrator may configure the cookies having any name or being associated with any service or resource, or any client 102 or server 106 to be proxied or not to be proxied based on such and similar configurations for the policies.

In yet another example, a configuration may set all the cookies for all the sites to be proxied in clientless VPN mode. Client consumed cookies that should not be proxied may be configured by specifying the name of the cookies in the patclass command or instruction. For example, if some application needs two cookies Cookie1 and Cookie2 to be present at the client side, a configuration may be identified as:

```
add patclass app_bypass_cookies
bind patclass app_bypass_cookies Cookie1
bind patclass app_bypass_cookies Cookie2
set vpn clientlessAccessprofile <app_profile> -ClientConsumedCookies
app_bypass_cookies
```

This code for the profile may the be used later in the clientlessAccessPolicy instruction, such as:

```
add vpn clientlessAccessPolicy <policyName> <rule>
<vpnclientlessAccessProfile>
```

The policy presented above may select the clientless access profile using the clientless access such that all cookies except cookies having name of Cookie1 and Cookie2 will be proxied. Therefore, given set of cookies may not be proxied for a subset of traffic which is identified by the policy rule. The policy rule may be used to select a particular web application or a particular server or a directory on a server. Using configurations similar to the one presented above, different set of cookies may be proxied for different set of users or groups of users or vpn vservers any of which may depend on which entity the configuration of the policy defines or addresses.

Figure 5:
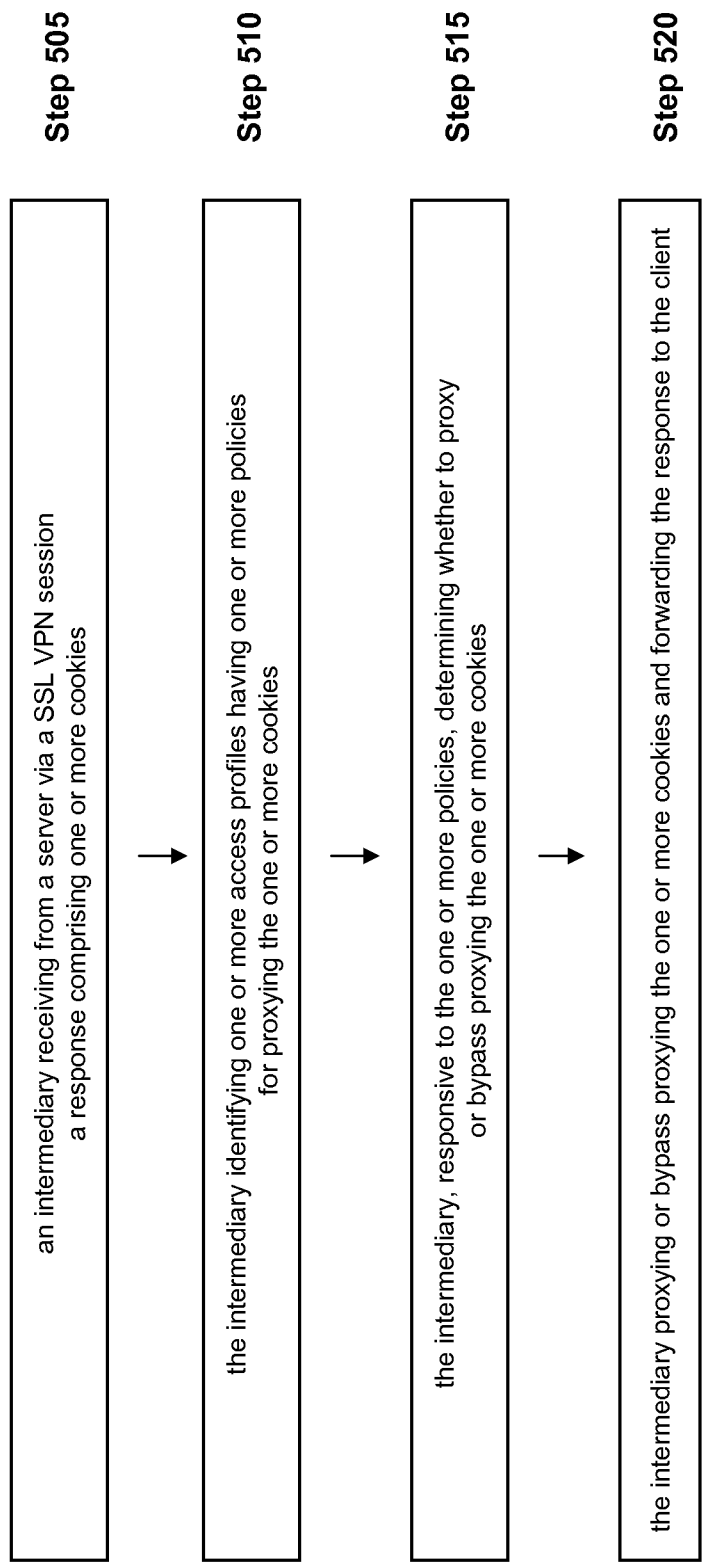
FIG. 5 is a flow diagram of an embodiment of a method for configuration driven cookie proxying by an intermediary.

Referring now to FIG. 5, an embodiment of steps of a method for configuration driven cookie proxying via an intermediary is illustrated. In brief overview, at step 505 an intermediary receives from a server via a SSL VPN session a response comprising one or more cookies. At step 510, the intermediary identifies one or more access profiles that have one or more policies for proxying the one or more cookies. At step 515, the intermediary, responsive to the one or more policies, determines whether to proxy or bypass proxying the one or more cookies. At step 520, the intermediary proxies or bypasses proxying the one or more cookies and forwards the response to the client.

In more detail, at step 505 the intermediary 200 receives from a server 106 via any session or connection a response comprising one or more cookies. In some embodiments, the intermediary 200 receives any number of responses from any number of servers 106, such as HTTP responses or responses including content or service that is requested by the client 102. In some embodiments, the intermediary 200 receives the response from the server 106 via a SSL VPN session. In further embodiments, intermediary 200 receives the response from the server 106 via a clientless SSL VPN session. In still further embodiments, intermediary 200 receives the response from the server 106 via a client based SSL VPN session. In some embodiments, the response includes one or cookie cookies. The response may include a server consumed cookie, or a cookie that is used, read, edited or written to by the server 106. In further embodiments, the response includes a client consumed cookie or a client side cookie, or a cookie that is used, read, edited or written to by the client 102. In yet further embodiments, the response includes a cookie that is used, read and written to by the server 106 and by the client 102. In some embodiments, the response includes a plurality of cookies of any type, form and kind. The cookies may be used for tracking client sessions, maintaining client related information or helping the server 106 and client 102 to share or track information. In some embodiments, the response includes a URL. The URL may include cookies or portions of cookies, such as cookie values.

At step 510, the intermediary identifies one or more access profiles that have one or more policies for proxying the one or more cookies. The intermediary 200 may use any subcomponent, unit, function or device of the intermediary 200 to identify one or more access profiles. In some embodiments, a policy engine, such as policy engine 236 may include one or more policies for identifying an access profile. The access profile may be identified based on a portion of the response from the server 106. The access profile may be identified based on a URL or a portion of the URL from the server 106. The access profile may be identified based on a portion of the content of the response and a configuration of one or more policies of the access profile that is associated with the portion of the content of the response. In some embodiments, the access profile is identified based on a match between a portion of the response from the server 106 and a configuration of the access profile that selects one or more policies of the access profile in response to the match. In further embodiments, the access profile is identified based on a match between a portion of the response from the server 106 and a configuration of the policy of the access profile that triggers one or more actions of the one or more matched policies. In some embodiments, access profile is identified based on a match between an information relating a client 102 session or connection and a configuration of a policy of the access profile that triggers the action of the policy. In further embodiments, access profile is identified based on a match between an a client based cookie from the response and a configuration of a policy of the access profile that triggers the action of the policy based on the match with the client based cookie. In still further embodiments, access profile is identified based on a match between a server side cookie of the response and a configuration of a policy of the access profile that triggers the action of the policy based on the match with the server cookie In still further embodiments, access profile is identified based on a match between a client 102 out of a specific group of clients and a configuration of a policy of the access profile that triggers the action of the policy based on the match with any of the clients from the group of clients. In further embodiments, access profile is identified based on a match between a specific application or resource or a type of application or resource the client 102 is accessing or using and a configuration of a policy of the access profile that triggers the action of the policy based on this match. The configurations of the policies of the access profiles may be based on any information relating the clients 102, servers 106, types of connections or sessions used by the clients and servers, configurations of the clients and servers, users on the clients 102, information relating the software or applications used by the clients 102 or any other type and form of information available to the appliance 200. In some embodiments, access profile is identified based on a match between an type of session or connection the client 102 is using, such as client based or clientless SSL VPN session and a configuration of a policy of the access profile that triggers the action of the policy based on the match. In further embodiments, access profile is identified based on a match between an information relating a file, webpage, application, resource or service that the client 102 has requested and a configuration of a policy of the access profile that triggers the action. In some embodiments, the intermediary identifies access profiles and policies for any transmission between the client 102 and server 106. In some embodiments, one access profile and one policy is identified per a single response of the server 106 or per a single request of the client 102. In other embodiments, any number of access profiles and any number of policies of the access profiles are identified for a single response from the server or a single request of the client.

At step 515, the intermediary responsive to the one or more policies, determines the proxying actions to be implemented. In some embodiments, the intermediary in response to one or more identified policies of the one or more identified access profiles determines whether to proxy or not to proxy cookies of the response. In further embodiments, the intermediary determines how to proxy the cookies. The actions of the policies that are triggered by the configurations of the policies may include proxying or bypassing of the proxying of the cookies. Proxying of the cookies may involve any handling of the cookies, such as generating, terminating, inserting, removing, rewriting or otherwise editing or transforming any of the cookies of the response. In some embodiments, proxying of the cookies involves rewriting the cookies, editing the cookies, removing the cookies or inserting the cookies of the response from the server 106 or of the request of the client 102. Proxying of the cookies may further involve the intermediary 200 generating, terminating, modifying, inserting or removing cookies to and from the transmissions, such as the responses from the server 106 and requests from the clients 102 that are traversing the appliance 200. The policy may determine that the appliance 200 should bypass proxying or that the appliance should not proxy the cookies from the transmission. In such embodiments, the appliance 200 simply does not modify or change or otherwise handle the cookies from the transmissions. Cookies may be handled in a variety of ways depending on the configuration or settings of the policy. In some embodiments, the appliance 200 determines to generate a new cookie for the response or the request traversing the appliance 200. In further embodiments, the appliance 200 determines modify a value of the cookie from the response or the request. In still further embodiments, the appliance 200 determines to rewrite a portion of the cookie from the response or the request. In still further embodiments, the appliance 200 determines to insert a cookie associated with a client 102 or the server 106 into the transmission between the client 102 and server 106. In yet further embodiments, the appliance 200 determines to remove a cookie from the transmission between the client 102 and server 106. In still further embodiments, the appliance determines to terminate a cookie used for the transmission between the client 102 and server 106. These and similar actions may be further specified by the policies which may include or point to any number of steps or instructions for making or implementing these and similar determinations.

At step 520, the intermediary may implement any action determined by the policies of the access profiles. In some embodiments, the intermediary proxies or bypasses proxying of the one or more cookies and forwards the response to the client 102. In further embodiments, the intermediary proxies or bypasses proxying of the one or more cookies and forwards the request to the server 106. The intermediary may proxy a cookie as instructed or specified by the one or more actions of the policies identified or matched by the configurations. In some embodiments, the intermediary 200 generates a cookie. In other embodiments, the intermediary 200 terminates a cookie. In some embodiments, the intermediary forwards the response or the request without taking any action on the cookie or cookies within the response or the request. In further embodiments, the intermediary modifies the cookies from the response or the request as instructed or as identified by the actions of the policies identified or by access profiles identified. The intermediary 200 may, following the actions taken or implemented, forward the request or the response to its destination. In some embodiments, the intermediary 200 forwards the request to the server 106. In other embodiments, the intermediary 200 forwards the response to the client 102.

We claim:

1. A method for configuration driven proxying of cookies by an intermediary between one or more servers and one or more clients, the intermediary establishing SSL VPN sessions between the one or more servers and the one or more clients, the method comprising:
    (a) receiving, by an intermediary, a response from a server to a request of a client via a clientless SSL VPN session established by the intermediary between the server and the client, the response comprising one or more cookies;
    (b) identifying, by the intermediary, via the request or the response based on identification of a type of resource, an access profile for the clientless SSL VPN session, the access profile identifying one or more policies for proxying cookies; and
    (c) determining, by the intermediary responsive to the one or more policies of the access profile, whether to proxy the one or more cookies, comprising handling the one or more cookies on behalf of the client, or to bypass proxying for the client by forwarding the response with the one or more cookies from the server to the client without modifying the one or more cookies.

2. The method of claim 1, wherein step (a) further comprising receiving, by the intermediary, the response a client consumed cookie of the one or more cookies, wherein step (b) further comprises the access profile identifying a policy comprising a cookie proxy action for the client consumed cookie, and wherein step (c) further comprises bypassing proxying, by the intermediary, the client consumed cookie responsive to the policy.

3. The method of claim 2, further comprises retaining, by the intermediary, the client consumed cookie in the response forwarded to the client.

4. The method of claim 1, wherein step (a) further comprising receiving, by the intermediary, via the response a server cookie of the one or more cookies and wherein step (c) further comprises proxying by the intermediary the server cookie.

5. The method of claim 4, further comprising removing, by the intermediary, the server cookie from the response and forwarding the response to the client.

6. The method of claim 1, wherein step (c) comprises proxying, by the intermediary, the one or more cookies of the response responsive to determining via the one or more policies that client does not support the one or more cookies.

7. The method of claim 1, wherein step (b) comprises the access profile identifying a policy defining a cookie proxy action for a server consumed cookie of a specified domain name and wherein step (c) comprising modifying, by the intermediary, the response as specified by the action of the policy.

8. The method of claim 1, comprising identifying the access profile based on the identification of the type of resource, the resource comprising an application.

9. The method of claim 1, further comprising the access profile identifying a policy comprising a cookie proxy action to bypass proxying a cookie of the one or more cookies based on identification of a user or a group of the user.

10. The method of claim 1, further comprising the access profile identifying a policy to bypass proxying a cookie of the one or more cookies based on identification of a virtual server of the intermediary.

11. The method of claim 1, wherein step (c) further comprises proxying, by the intermediary, the one or more cookies of the response unless the one or more policies of the access profile identify a cookie of the one or more cookies to be bypassed.

12. An intermediary device for configuration driven proxying of cookies between one or more servers and one or more clients, the intermediary device establishing SSL VPN sessions between the one or more servers and the one or more clients, the intermediary device comprising:
    a packet engine executing on a device of the intermediary device, for receiving a response from a server to a request of a client via a clientless SSL VPN session established by the intermediary device between the server and the client, the response comprising one or more cookies,
    a policy engine for identifying, via the request or the response based on identification of a type of resource, an access profile for the clientless SSL VPN session, the access profile identifying one or more policies for proxying cookies; and
    wherein the intermediary device determines responsive to the one or more policies of the access profile whether to proxy the one or more cookies, comprising handling the one or more cookies on behalf of the client, or to bypass proxying for the client by forwarding the response with the one or more cookies from the server to the client without modifying the one or more cookies.

13. The intermediary device of claim 12, wherein the packet engine receives via the response a client consumed cookie of the one or more cookies, the access profile identifies a policy comprising a cookie proxy action for the client consumed cookie, and wherein the intermediary device determines to bypass proxying the client consumed cookie responsive to the policy.

14. The intermediary device of claim 13, wherein the intermediary device retains the client consumed cookie in the response forwarded to the client.

15. The intermediary device of claim 12, wherein the packet engine receives via the response a server cookie of the one or more cookies and wherein the intermediary device proxies the server cookie responsive to the one or more policies.

16. The intermediary device of claim 15, wherein the intermediary device removes the server cookie from the response and forwards the response to the client.

17. The intermediary device of claim 12, wherein the intermediary device proxies the one or more cookies of the response responsive to determining via the one or more policies that client does not support the one or more cookies.

18. The intermediary device of claim 12, wherein the policy engine identifies via the access profile a policy of the one or more policies defining a cookie proxy action for a server consumed cookie of a specified domain name and wherein the intermediary device modifies the response as specified by the action of the policy.

19. The intermediary device of claim 12, wherein the policy engine identifies the access profile based on the identification of the type of resource, the resource comprising an application.

20. The intermediary device of claim 12, wherein the policy engine identifies via the access profile a policy comprising a cookie proxy action to bypass proxying a cookie of the one or more cookies based on identification of a user or a group of the user.

* * * * *